United States Patent [19]

Hann et al.

[11] Patent Number: 4,799,153
[45] Date of Patent: Jan. 17, 1989

[54] METHOD AND APPARATUS FOR ENHANCING SECURITY OF COMMUNICATIONS IN A PACKET-SWITCHED DATA COMMUNICATIONS SYSTEM

[75] Inventors: J. David Hann, Vienna, Va.; Theodore S. Holdahl, Bethesda, Md.; James C. P. Lum, Herndon, Va.

[73] Assignee: Telenet Communications Corporation, Reston, Va.

[21] Appl. No.: 97,278

[22] Filed: Sep. 17, 1987

Related U.S. Application Data

[63] Continuation of Ser. No. 681,751, Dec. 14, 1984, abandoned.

[51] Int. Cl.$^4$ ............................................. H04L 9/00
[52] U.S. Cl. ............................ 364/200; 340/825.34; 380/25
[58] Field of Search ............... 340/825.34; 235/382, 235/382.3; 380/23, 25; 364/900 MS File, 200 MS File

[56] References Cited

U.S. PATENT DOCUMENTS

| | | | |
|---|---|---|---|
| 3,938,090 | 2/1976 | Borison et al. | 340/149 A |
| 3,956,615 | 5/1976 | Anderson et al. | 235/61.7 B |
| 4,075,460 | 2/1978 | Gorgens | 235/420 |
| 4,097,727 | 6/1978 | Ulch | 235/382 |
| 4,281,216 | 7/1981 | Hogg | 380/23 |
| 4,310,720 | 1/1982 | Check | 235/382 X |
| 4,386,266 | 5/1983 | Chesarek | 235/380 |
| 4,423,287 | 12/1983 | Zeidler | 235/379 X |
| 4,562,535 | 12/1985 | Vincent et al. | 364/200 |
| 4,575,793 | 3/1986 | Morel et al. | 364/200 |
| 4,601,011 | 7/1986 | Grynberg | 380/23 |

FOREIGN PATENT DOCUMENTS

| | | |
|---|---|---|
| 372989 | of 0000 | Sweden . |
| 1576232 | 10/1980 | United Kingdom . |
| 1604466 | 12/1981 | United Kingdom . |
| 8302343 | 7/1983 | World Int. Prop. O. . |

OTHER PUBLICATIONS

*Computer Network Architectures and Protocols*, edited by Paul E. Green, (Plenum Press : New York) copyrighted 1982, pp. 20–31, 55, 85, 110–145, 148–171, 213–248.

Primary Examiner—Gary V. Harkcom
Assistant Examiner—Lawrence E. Anderson
Attorney, Agent, or Firm—Leitner, Greene & Christensen

[57] ABSTRACT

Security of communications in a packet-switched data communications system is enhanced by introducing terminal and host security devices into the system in communicative relationship with a terminal and a host processor, respectively. In response to a user-initiated data entry at the terminal, the terminal security device generates an initial data packet indicative of user authorization or not, but which is unsuited for processing by the addressed processor, ahead of additional data packets containing user-entered message data to be processed by the addressed processor. The host security device intercepts and processes the initial data packet and, if user authorization is indicated therein, replaces it with an artificial data packet solely to render the additional packets amenable to processing by the addressed processor and thereby to establish a communications session between user terminal and processor-associated database to which access was requested.

9 Claims, 17 Drawing Sheets

METHOD AND APPARATUS FOR ENHANCING SECURITY OF COMMUNICATIONS IN A PACKET-SWITCHED DATA COMMUNICATIONS SYSTEM

CROSS REFERENCES TO RELATED APPLICATIONS

This application is a continuation of copending application Ser. No. 06/681,751 of the same inventors filed Dec. 14, 1984, now abandoned, and further contains subject matter claimed in copending application Ser. No. 06/681,758 of the same inventors also filed Dec. 14, 1984, now abandoned, both of which prior applications are assigned to the same assignee as this application.

TECHNICAL FIELD

This invention relates to the field of data communications systems, and more particularly to apparatus which when installed in a data communications system provides substantially improved security against unauthorized access to a database of a host of the system.

BACKGROUND OF THE INVENTION

A typical data communications system comprises a network, one or more hosts connected to the network, and means by which one or more users may obtain the services of a host via the network, e.g., through a user terminal connected to the network via a telephone circuit. A host is an intelligent processor or device connected to a network that provides information and/or communications services to remote users through the network. A host contains control software and at least one database stored in its memory.

It is well known that data communications systems currently face a variety of security and privacy threats. One such threat, which is the subject of the invention herein, is that of unauthorized access to a host's database by a user. Once unauthorized access has been gained, unauthorized interception or modification of information in the database may occur. An intruder may, for example, obtain private or personal information about individuals; he may obtain confidential economic, market, or technical information on competitive organizations; or he may acquire restricted information of governmental agencies He may make additions and/or deletions to the database which have severe financial or other consequences. He may obtain the services of the host at no cost to him (the intruder) while incurring an erroneous charge to an authorized user.

One safeguard against unauthorized access is the password test. Under this scheme, a user is refused access by a host to a database unless the user provides a valid password, presumably the password preassigned to the user. Experience shows this method provides only limited protection. Password validation is vulnerable to systematic or random guessing of passwords. More recent password systems permit the user to proffer a password once or a small number of times in order to prevent multiple trials at guessing a valid password.

Another safeguard against unauthorized access is the identifier test. Under this scheme, the user generally is assigned a plastic card with a stripe of magnetic tape mounted on one side of the card. A unique identification number is magnetically encoded in the tape. The user generally does not know the identification number encoded in the card. In order to gain access to a database or a portion of a database, the user is required to insert the card into a device having means for reading the identification number from the card and transmitting the number to the host. Access is granted by the host only if the identification number is valid. This method may be employed in conjunction with a password test.

The identifier test used in conjunction with a password test offers substantially more security against unauthorized access than the password test alone. The identification number is not subject to guessing by third parties because the number can be entered only by means of the card. The user maintains security by retaining physical control of the card. Even if the card is misappropriated, the password test is an additional hurdle which must be overcome before unauthorized access may be gained. The identification number generally is a longer and more complex number or code than the password, so that the probability of guessing a valid identification number is less than that of guessing a valid password. Since the identification number is entered automatically, simplicity is not an advantage as is the case with a password which may be committed to human memory. The more complex identification number is an advantage in the case where a counterfeit card is used or electronically simulated.

In a data communications system, responsibility for security generally resides with the hosts. There may be varying levels of security between hosts or between different databases administered by a single host. The hosts generally possess user-specific information for billing and other administrative functions. In a public network, where access to the network is available to anyone having access to a terminal, there are even stronger reasons for assigning security responsibilities to the hosts.

Some hosts have no security measures against unauthorized access, not even password security measures. Even where password security exists, many hosts may be insecure It is often desirable to upgrade these hosts to the level of identifier security. The upgrade from no security to identifier security or from password security to identifier security generally requires a substantial revision of the host's control software. The typical host is heavily involved in providing information or other services to users and in maintaining its database. The task of revising its control software may not be well received by those responsible for the administration of a host, not only because the task is costly but also because it presents the specter of a possible disruption of the host's ability to provide services to its users.

It would constitute an advancement of the art if there were means by which a data communications system with a host having no security measures or password security measures could be upgraded to the level of identifier security, simply, inexpensively, and without requiring revision of existing software of the host or network.

SUMMARY OF THE INVENTION

It is, therefore, an object of the invention to obviate the deficiencies in the prior art.

It is another object of the invention to provide apparatus which when installed in a data communications system will provide substantially improved security against unauthorized access to a database of a host of the system.

It is a further object of the invention to provide means for upgrading a data communications system having no security measures to a system with identifier security measures.

Another object of the invention is to provide means for upgrading a data communications system having password security measures to a system with identifier security measures.

A further object of the invention is to provide security apparatus for a data communications system which may be implemented simply and inexpensively.

Another object of the invention is to provide security apparatus for a data communications system which may be implemented without requiring revision of the control software of a host.

A further object of the invention is to provide security apparatus for a data communications system which may be implemented without requiring revision of the control software of the network.

It is another object of the invention to provide means for upgrading security in a data communications system whereby such means may be implemented by installation of a separate piece of equipment, called a host security device, between the host and network.

It is a further object of the invention to provide means for upgrading security in a data communications system whereby such means may be implemented by installation of a separate piece of equipment, called a terminal security device, at the same site as the user terminal.

These objects are accomplished, in one aspect of the invention, by the provision of security apparatus for improving security against unauthorized access in a data communications system. The data communications system includes a network, a host coupled with the network, and means for coupling a terminal with the network. The host includes an intelligent processor having control software and a database stored in its memory. The terminal provides means by which a user may gain access to the database of the host via the network.

The security apparats in accordance with the invention comprises a terminal security device located at the same site as the terminal and coupled with the terminal, and a host security device coupled between the network and the host. The terminal security device has sensing means for sensing a host address and a user identification code encoded in a tangible medium; and control means coupled with the sensing means for transmitting the host address and user identification code to the network with the host being the addressee of the transmission of the user identification code. The control means are adapted such that the terminal security device may be implemented without revision of the control software of the host. There are means for coupling the terminal security device with the terminal.

The host security device has control means for receiving, processing, and transmitting communications traffic between the network and the host; for intercepting the transmission of the user identification code by the terminal security device such that the transmission of the user identification code will not be received by the host; for requiring the user to provide a valid user identification code as a condition precedent to the user's gaining access to the database of the host; and for disconnecting the terminal from the host in the event the user identification code is determined to be invalid. The control means are adapted such that the host security device may be implemented without revision of the control software of the host. There are means for coupling the host security device with the network and host.

A data communications system having security apparatus in accordance with the invention will provide a substantially higher level of security against unauthorized access to a database of a host than would be available without such security equipment. The security apparatus may be implemented with minimal cost and virtually no interference with ongoing system operations.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
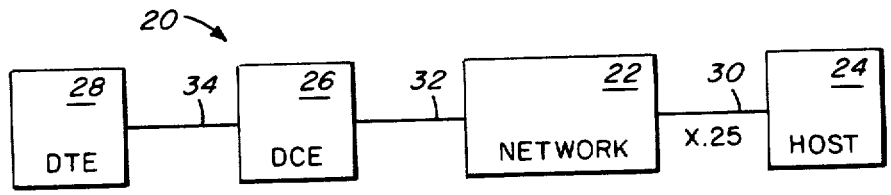
FIG. 1 contains a block diagram of a data communications system before installation of the invention.

FIG. 1 shows a block diagram of a data communications system 20 before installation of the invention. Network 22 is a packet-switched network coupled with host 24 via line 30. Line 30 is a high-speed digital channel adhering to the X.25 protocol standard of the Consultative Committee for International Telephone and Telegraph. A user operates from data terminal equipment (DTE) 28, hereinafter referred to simply as terminal 28. For purposes herein, terminal 28 includes any user end equipment located at the user's site which enables the user to transmit and receive information through system 20. Terminal 28 is connected to analog access line 34, e.g., a telephone circuit. The network supplier generally provides digital circuit terminating equipment (DCE) 26 which serves as means for connecting terminal 28 to network 22. DCE 26 includes a data modem which converts analog signals from line 34 into digital signals for transmission to network 22 over digital line 32, and conversely. Transmission by DCE 26 of digital signals may be in the form of packets, and network 22 may be a packet-switched network. Terminal 28 includes a data modem for converting digital user signals into analog form for transmission over line 34, and conversely. Host 24 includes a first intelligent processor having control software and a database stored in its memory. Terminal 28 provides means by which a user may gain access to the database via network 22. Network 22 includes a second intelligent processor having network control software stored in its memory.

Figure 2:
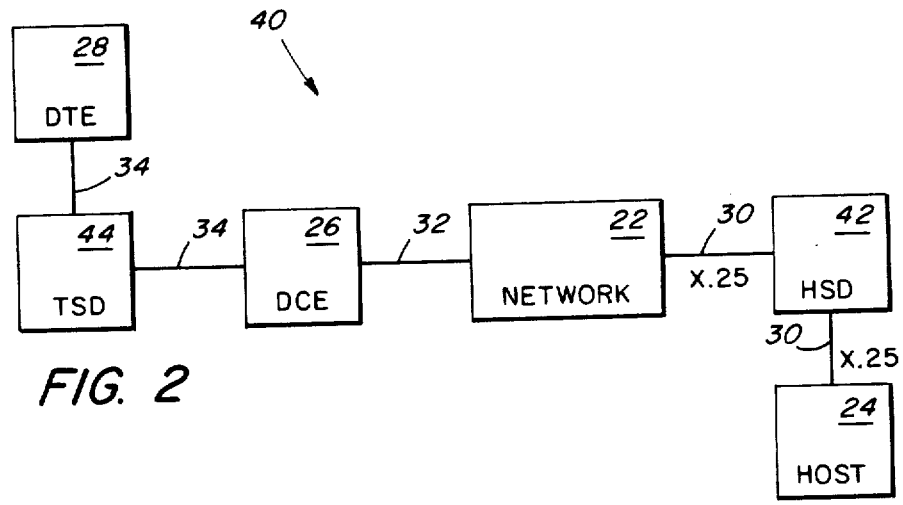
FIG. 2 contains a block diagram of the data communications system of FIG. 1 after installation of security apparatus in accordance with the invention.

FIG. 2 shows a block diagram of data communications system 40, which is system 20 after installation of security apparatus in accordance with the invention. The security apparatus includes host security device (HSD) 42 and terminal security device (TSD) 44. HSD 42 is a separate component including a third intelligent processor. HSD 42 is connected between network 22 and host 24 with line 30 leading into and out of HSD 42. HSD 42 has means for receiving, processing, and retransmitting all communications traffic between network 22 and host 24. TSD 44, located at the user's site, is a separate component including a fourth intelligent processor. TSD 44 may be connected between terminal 28 and DCE 26 with line 34 leading into and out of TSD 44.

TSD 44 has means for sensing a host address and a user identification code encoded in a tangible medium. A preferred embodiment of the tangible medium is a plastic card with a stripe of magnetic tape affixed on one side of the card. The host address and user identification codes are magnetically encoded on the stripe of magnetic tape. In such an example, TSD 44 has means for reading the host address and user identification code from the magnetic stripe when the card is properly engaged with TSD 44.

TSD 44 has means for transmitting the host address and user identification codes to network 22. The packet containing the user identification code, having host 24 as the addressee, will be intercepted by HSD 42. HSD 42 has means for intercepting the packet containing the user identification code and means for requiring the user to provide a valid user identification code as a condition precedent to the user's gaining access to a database of HSD 42.

Implementation of TSD 44 and HSD 42 into system 20 may be made without modification of the existing control software of either host 24 or network 22. For purposes herein, the terms "existing software" or "existing control software" refer to the software of host 24 or network 22 prior to the installation of security apparatus in accordance with the invention. Each transmission made to network 22 by HSD 42 or TSD 44 must be in a format compatible with the existing software of network 22. Each packet transmitted by HSD 42 to host 24 must be in a format compatible with the X.25 protocol, and each packet must contain information which conforms with the system protocols and procedures programmed in the existing software of host 24. As will be explained in greater detail below, TSD 44 will cause a packet to be transmitted to network 22, with the apparent destination being host 24 which does not conform with procedures implemented by the existing software of host 24; this nonconforming packet contains the user identification code necessary for upgraded security. If the nonconforming packet were received by host 24, it would be processed incorrectly because the existing software of host 24 does not have identifier security capability. However, HSD 42 will intercept this nonconforming packet, process it, and implement appropriate identifier security measures by means of a conforming packet to host 24. Although TSD 44 and HSD 42 are physically part of system 40, host 24 and network 22 continue to operate logically as if neither component were present in the system.

Figure 3:
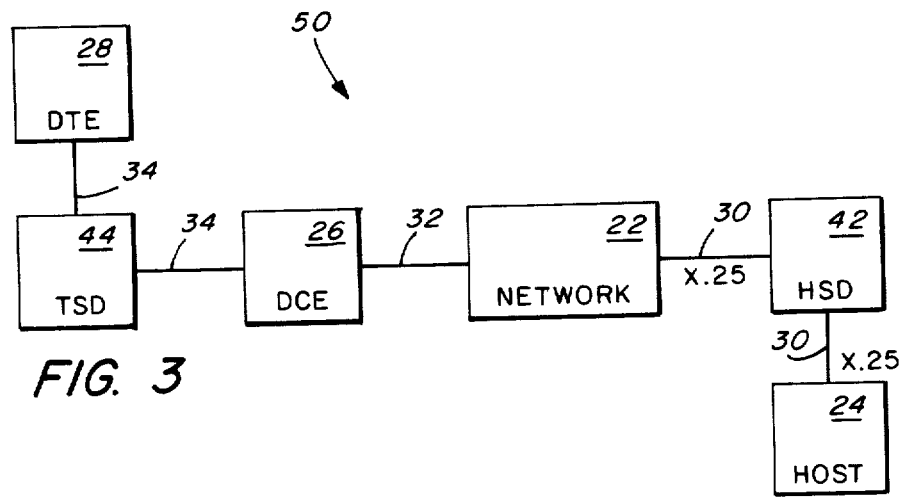
FIG. 3, contains a block diagram of the data communications system of FIG. 2 after the host security device has determined that the user identification code produced by the user is valid; the blocks shown in dashed lines indicate that the respective components are transparent to the network and host with respect to the user.

FIG. 3 shows a block diagram of data communications system 50, which is system 40 after HSD 42 has made its determination that the user identification code provided by the user is valid. HSD 42 is shown in dashed lines in the drawing to indicate that it is transparent to the rest of system 50 with respect to the user for the duration of the communications session. A "transparent" component, as used herein, is one which acts as a mere conduit for all communications between this particular user and host 24. HSD 42 has means for determining the identity of the source or sender of each packet transmitted to host 24; and HSD 42 has means for passing all packets from an authenticated user through to host 24 without alteration or appreciable delay. Likewise, HSD 42 has means for passing through all packets sent by host 24 to this user. When in the transparent mode, HSD 42 logically appears to the user and host 24 (regarding this user) as if it were not present in system 50.

TSD 44 is shown in FIG. 3 in dashed lines to indicate that TSD 44 also will be transparent when HSD 42 is transparent with respect to the user, although TSD 44 may become transparent earlier than HSD 42. TSD 44 may become transparent immediately after it has caused the packet containing the user identification code to be transmitted to network 22. When TSD 44 is in the transparent mode, it will not originate a transmission or otherwise affect system operations. TSD 44 remains transparent until the conclusion of the communications session.

Figure 4:
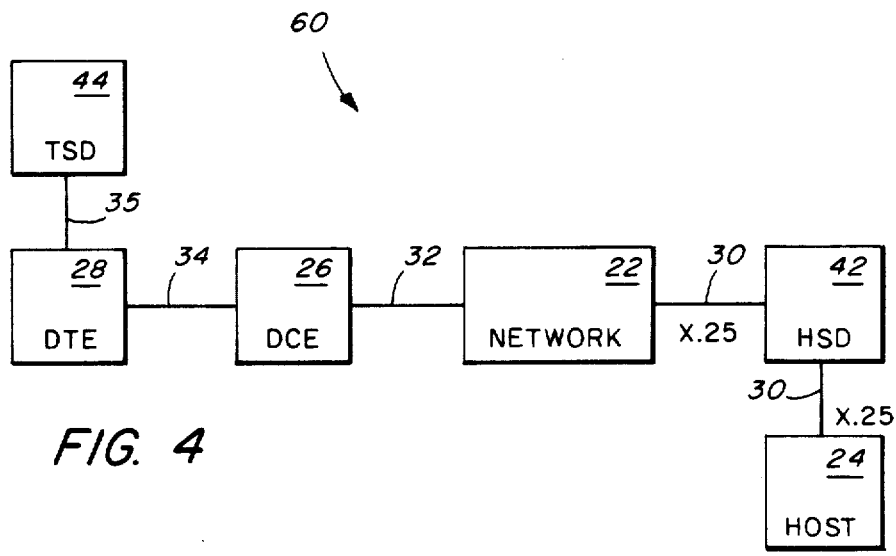
FIG. 4 contains a block diagram of the data communications system of FIG. 2 except that the terminal is coupled in series between the terminal security device and the digital ,circuit, terminating equipment.

FIG. 4 shows terminal 28 being connected in series between TSD 44 and DCE 26, which is an alternate embodiment of the invention. This configuration for the installation of TSD 44 is a preferred embodiment where terminal 28 has a built-in data modem. TSD 44 is connected to the auxiliary data port of terminal 28 by data line 35. In this configuration, TSD 44 has identical capabilities as when TSD 44 is installed in accordance with the configuration shown in FIG. 2.

METHODS OF AUTHORIZING ACCESS

Protection of a database against deliberate or accidental access by unauthorized persons may be accomplished by various access-control methods with varying degrees of security. No method is completely secure. Where a deliberate and sophisticated intruder is involved, enhanced security will increase the cost and risk to the intruder of overcoming the security measures. One desiring to maintain the security of the database seeks methods for which the cost of implementation is reasonably low relative to the cost, economic or otherwise, of a breach in security.

Security measures against unauthorized access generally involve data "locks" for which authorized users are provided with "keys" or "combinations." The term "user" describes a single person or a group of persons who have equal rights with respect to accessing a particular body of data of a particular host and who have common identity with respect to the host.

Three security classes of data are generally defined for data communications systems: public, limited-access, and private. Public data is open to all users for reading purposes. Special authority for writing (or changing) public data may be required. Limited-access data may be accessed only by authorized users. Different levels of authority may be required for reading or writing limited-access data, or for access to more sensitive segments of the data. Security measures for limited-access data may include means for authenticating the identity of the user and verifying that the user has the requisite authorization rights. Private data is open to a single user only. Security measures for private data may include means for verifying that the user is the owner of the data.

Security measures for authenticating the identity of a user may involve one or more of the following user keys: host address, user password, and user identification code. For purposes herein, each of these user keys comprises a sequence of characters which may contain mixtures of numeric, alphabetic, or special characters in any order. The host-address key enables the network to connect the user to the designated host. The password key enables the host to identify the user. The user identification code key enables the host security device to authenticate the identity of the user. The password is known by the user and is entered directly by him via the terminal. The host address and user identification code may not be known by the user and, preferably, should not be known by the user. In many systems, knowledge of either of these keys by the user may compromise the level of security. Both of these keys may be encoded in the tangible medium. They are entered automatically when the user engages the tangible medium with the terminal security device.

Figure 5:
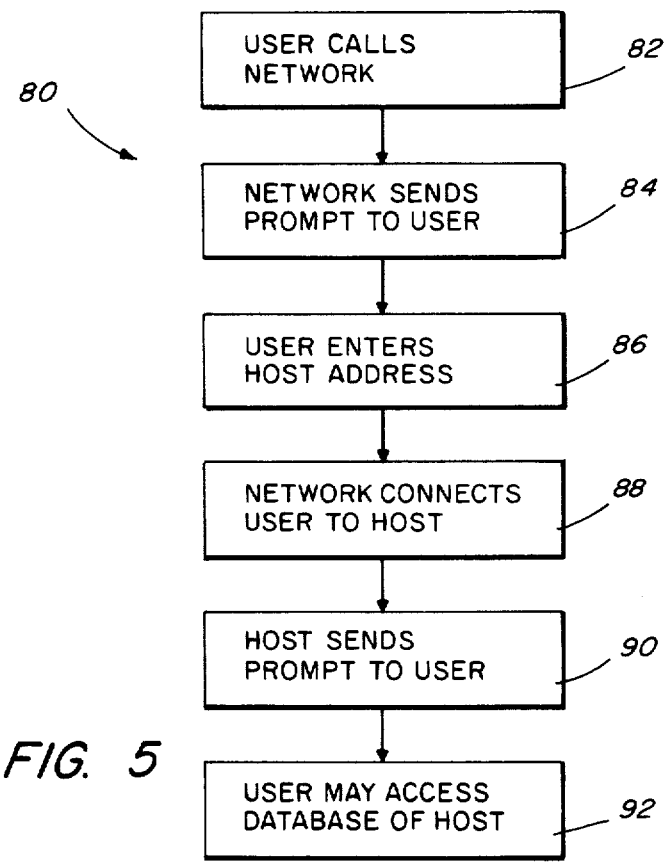
FIG. 5 is a system flowchart of the procedure by which a user may gain access to a database of a host in the data communications system of FIG. 1, wherein such system has no security measures against unauthorized access.

FIG. 5 contains system flowchart 80 showing a procedure by which a user gains access to the database of a host in a data communications system, such as system 20, wherein host 24 has no security measures against unauthorized access to its database. System 20 does not contain an embodiment of the invention. In the procedural step described in processing block 82, the user attempts to connect to network 22. Frequently, this is done by the user's calling a local node of DTE 28 by a telephone which is coupled to a data modem connected to or incorporated in terminal 28. When the connection is made, network 22 acknowledges the existence of the circuit and that user input is awaited by sending a standard message or symbol, called a prompt, to the user as indicated in block 84. The user responds in block 86 by entering the host address. The host address identifies the particular host, such as host 24, to which the user desires to be connected. The host address may also be thought of as a telephone number or port address of host 24. The host address generally is readily available in the operating instructions and promotional materials provided by host 24. Network 22 effectuates the connection between the user and host 24 in block 88 whereupon host 24 sends a prompt to the user in block 90. As indicated in block 92, the user now has gained access to the database of host 24.

Figure 6:
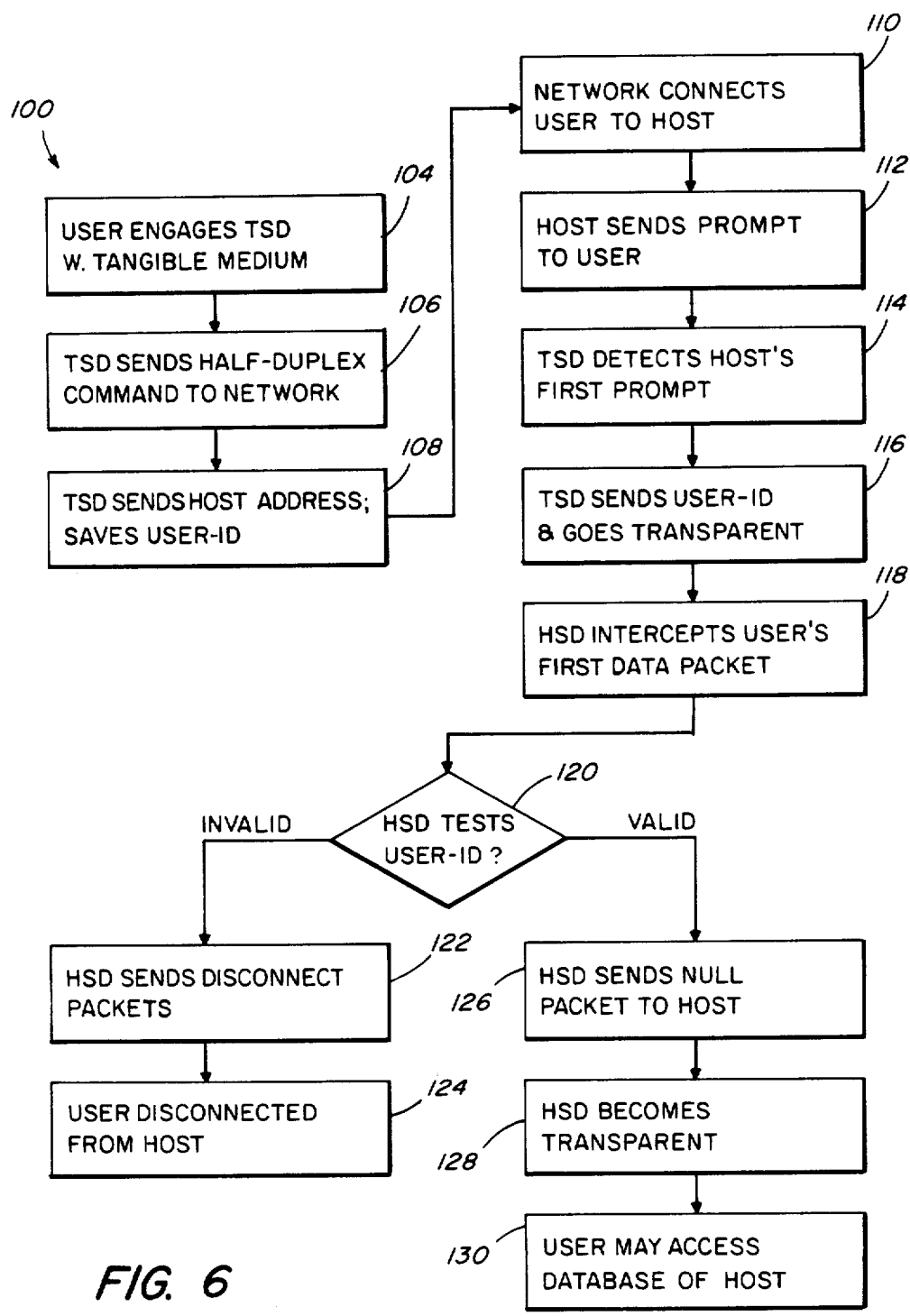
FIG. 6 is the system flowchart of FIG. 5 modified to accommodate the enhanced security provided by installation of security apparatus in accordance with the invention in the data communications system.

FIG. 6 contains system flowchart 100, which is flowchart 80 modified to accommodate installation of TSD 44 and HSD 24 into system 20; a preferred embodiment of the system is shown in FIG. 4 as system 60. In this embodiment of the invention, the security of system 60 has been upgraded from no security measures to identifier security by installation of security apparatus in accordance with the invention. The user initiates a communications session by engaging the tangible medium with TSD 44. In the procedure of system 60, the user does not know the host address key. The host address key and the user identification code are encoded in the tangible medium. The user provides the host address by appropriately engaging the tangible medium with TSD 44. This step is indicated in block 104 wherein TSD 44 reads both the host address and the user identification code from the tangible medium. In block 106, TSD 44 sends a half-duplex command to network 22. In the half-duplex mode, network 22 does not echo transmissions to terminal 28. In succeeding steps wherein TSD 44 transmits the host address and user identification code, the contents of these packets will not be displayed by terminal 28 because of the echo suppression. Thus, the user will not learn the host address or user identification code by reason of the transmissions of these user keys by TSD 44. Following transmission of the user identification code, TSD 44 will send a full duplex command to network 22, so that the network echo will be restored for user-entered transmissions. In block 108, TSD 44 transmits the host address to network 22 and saves the user identification code in its memory. The steps in blocks 110 and 112 are identical to the steps described in blocks 88 and 90, respectively. Network 22 and host 24 operate logically as if TSD 44 and HSD 42 were not present in system 60. The packet containing the host address, initiated by TSD 44 in block 108, is identical to the packet containing the host address which was caused to be sent by the user in block 86.

TSD 44 has means for monitoring the communications traffic between the user and network 22. As indicated in block 114, TSD 44 detects the transmission containing the first prompt from host 24; whereupon TSD 44 transmits the user identification code (which was previously stored in the memory of TSD 44). In block 116, TSD 44 transmits the user identification code and thereafter enters the transparent state for the duration of the communications session.

More precisely, TSD 44 transmits the user identification code to network 22 with host 24 as its addressee and apparent destination. The transmission by TSD 44 is serial. However, the serial data is converted to digital packets for transmission through network 22. Consequently, the user identification code will be in packetized form when detected by host 24. HSD 42 has means for monitoring the traffic between network 22 and host 24. When the user's first data packet is detected, HSD 42 intercepts this packet, as indicated in block 118. HSD 42 then validates the user identification code. As shown in decision block 120, the user identification code is determined to be either valid or invalid. If valid, HSD 42 transmits a null packet to host 24 in lieu of the user's first data packet, as indicated in block 126. This step is essential in order to maintain the proper sequencing of packets under the X.25 protocol so that communications may continue between the user and host 24. Alternatively, HSD 42 may renumber all subsequent user data packets; this method is more complex and is not employed in this embodiment of the invention. Immediately after transmitting the null packet, HSD 42 in block 128 becomes transparent to host 24 with regard to this user for the duration of the communications session. From this point, HSD 42 acts as a mere conduit between network 22 and host 24 with respect to packets traveling in either direction between this particular user and host 24. Block 130 indicates that the user now has gained access to the database.

If the result of decision block 120 is that the user identification code is invalid, HSD 24 implements procedures which will cause the user to be disconnected from host 24. In block 122, HSD 24 transmits a disconnect packet to host 24 and to the user. Each disconnect packet causes the respective recipient to clear the virtual circuit or logical channel established between host 24 and the user, which results in the user's being disconnected as indicated in block 124.

Figure 7:
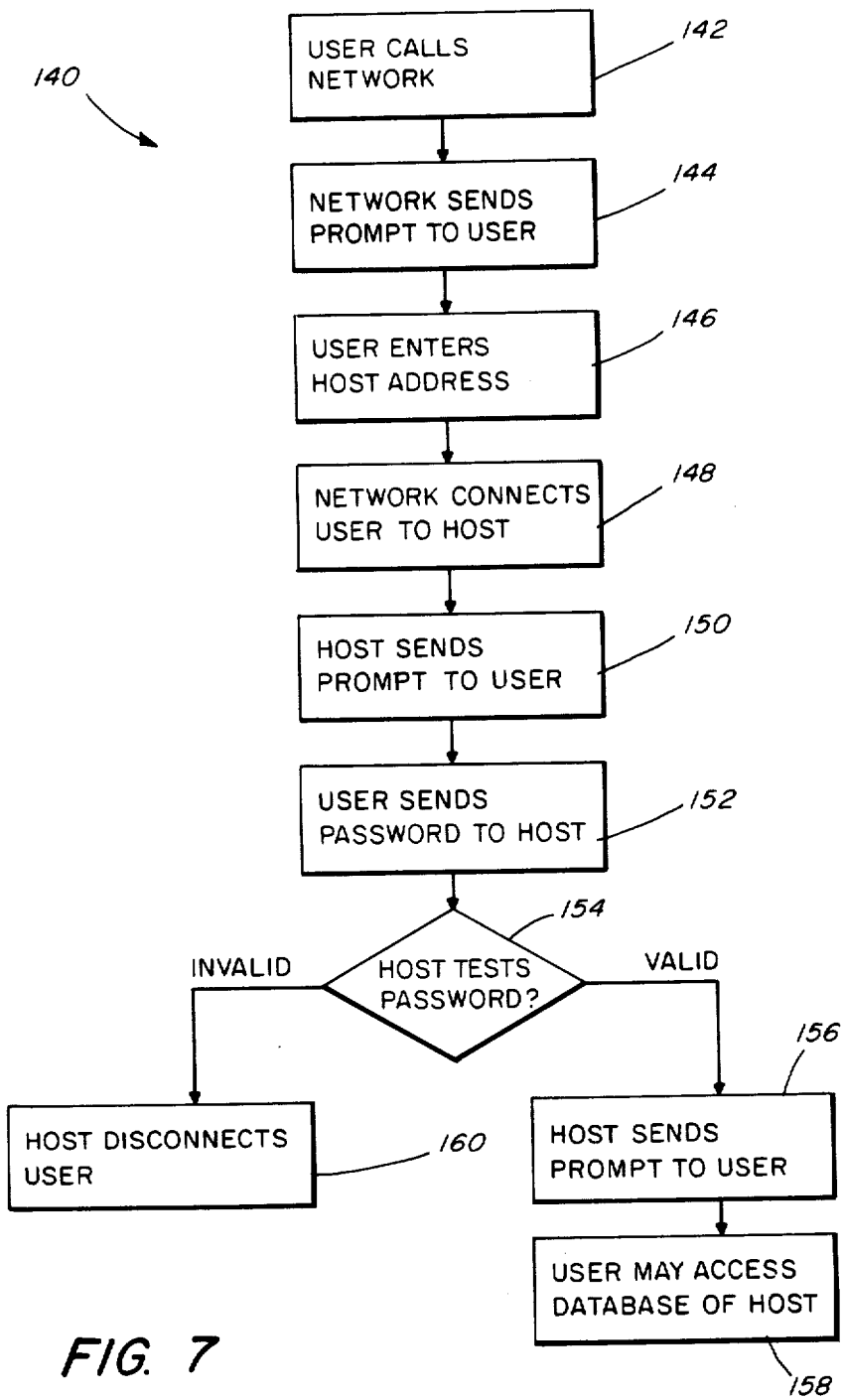
FIG. 7 is a system flowchart of the procedure by which a user may gain access to the database of a host in the data communications system of FIG. 1, wherein such system has password security measures against unauthorized access.

FIG. 7 contains system flowchart 140 showing a procedure by which a user gains access to the database of a host in a data communications system, such as system 20, wherein host 24 imposes password security measures against unauthorized access to its database. System 20 does not contain an embodiment of the invention. The first five steps described in blocks 142-150, inclusive, are identical respectively to the steps described in blocks 82-90, inclusive, of flowchart 80. In block 152, the password security procedure of system 20 requires the user to send a password in the user's first data packet to host 24. The password is known to the user and entered via terminal 28. Upon receipt of the packet containing the password, host 24 validates the password in decision block 154. If the password is valid, host 24 sends a prompt to the user, as shown in block 156. Upon the receipt of this prompt, the user has gained access to the database, as indicated in block 158. Block 160 shows the branch in the procedure taken by host 24 in the event the user's password is not valid. In this case, host 24 disconnects the user by clearing the virtual circuit or logical channel assigned to the user.

Figure 8A:
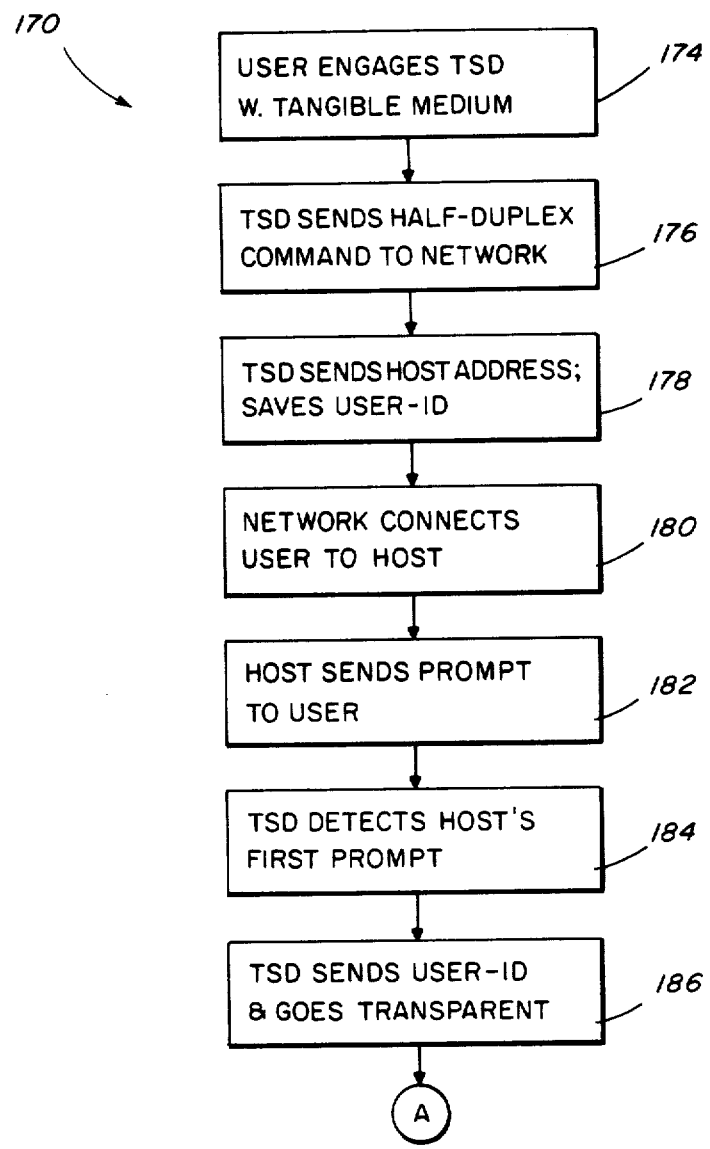
FIGS. 8A and 8B contain the system flowchart of FIG. 7 modified to accommodate the enhanced security provided by installation of security apparatus in accordance with the invention in the data communications system.
Figure 8B:
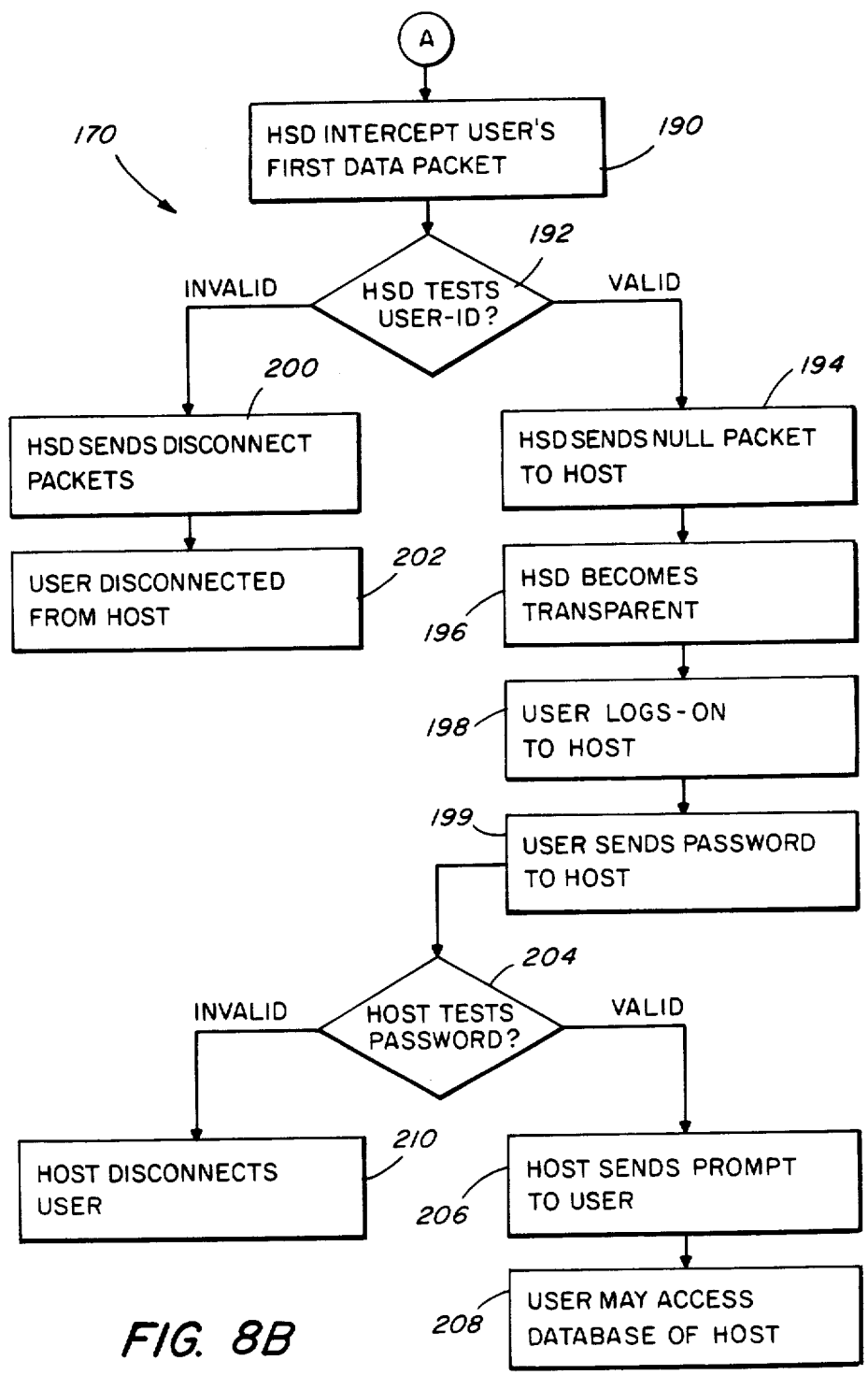

FIGS. 8A and 8B contain system flowchart 170, which is flowchart 100 modified to accommodate installation of TSD 44 and HSD 24 into system 20; a preferred embodiment of the system is shown in FIG. 4 as system 60. Flowchart 170 describes the procedure by which a user may gain access to a database of a host in a data communications system, such as system 60, in which there are password security measures against unauthorized access. In this embodiment of the invention, the security of system 60 has been upgraded from password security to identifier security. The steps described in blocks 174-186, inclusive, are identical respectively to the steps described in blocks 104-116, inclusive, of flowchart 100. In block 186, TSD 44 causes the user's first data packet to be sent with addressee and apparent destination being host 24. In block 190, HSD 42 intercepts the user's first data packet, containing the user identification code.

In decision block 192, HSD 42 tests the user identification code. If valid, the procedure in block 194 is followed wherein HSD 42 sends a null packet to host 24 in order to maintain the proper sequencing of packets under the X.25 protocol. In block 196, HSD 42 becomes transparent for the duration of the communications session with respect to this user. In block 198, the user performs the log-on procedure with host 24 in which the user sends his password to host 24, as indicated in block 199. HSD 42 may be in the transparent mode at the time the packet containing the user's password is forwarded to host 24.

The steps described in blocks 204-210, inclusive, are identical respectively to the steps contained in blocks 154-160, inclusive, of flowchart 140. In this sequence of steps, host 24 performs the password test as if TSD 44 and HSD 42 were not present in system 60.

If the outcome of decision block 192 is that the user identification code is invalid, HSD 42 sends disconnect packets both to host 24 and terminal 28, as shown in block 200. In block 202, the user is disconnected from host 24 in the same manner as described for block 124 of flowchart 100.

HOST SECURITY DEVICE HARDWARE

Figure 9:
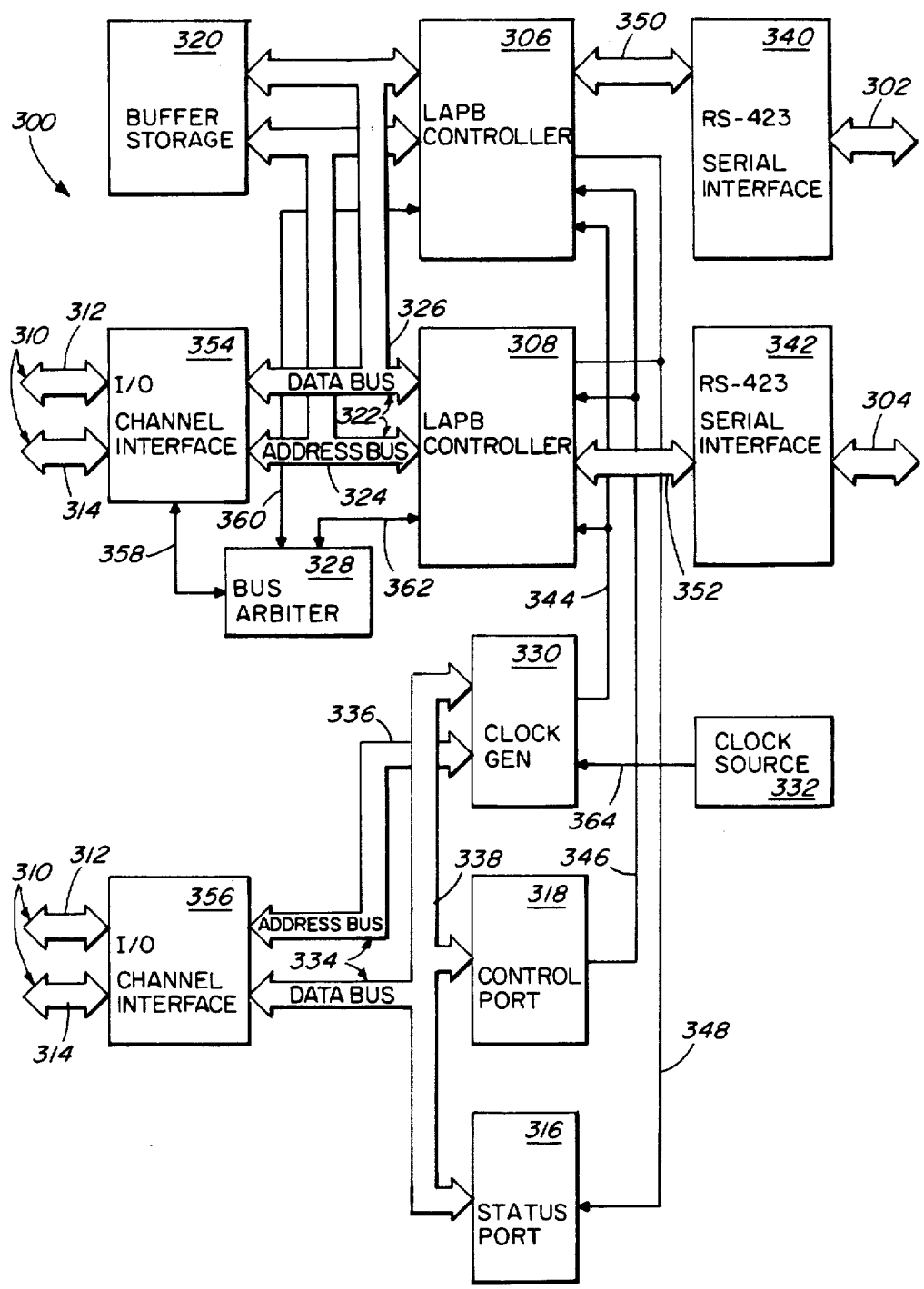
FIG. 9 contains a block diagram of a dual X.25 interface circuit which is employed in an embodiment of a host security device in accordance with the invention.

A preferred embodiment of a host security device comprises a personal computer, e.g., the IBM-PC, a dual X.25 interface circuit adapted to occupy a single expansion slot of the personal computer, and software executable by the personal computer for implementing the functions of the host security device. FIG. 9 contains a functional block diagram 300 of a dual X.25 interface circuit adapted to occupy a single expansion slot of the IBM-PC.

The dual X.25 interface circuit provides two high-level data link controller (HDLC) serial data channels, 302 and 304. Two link-access procedure balanced (LAPB) controllers, 306 and 308, perform all of the level 2 HDLC protocol processing of the X.25 protocol standard. LAPB controller 306 is coupled with serial channel 302 via serial interface 340 and bus 350; and LAPB controller 308 is coupled with serial channel 304 via serial interface 342 and bus 352.

The dual X.25 interface circuit occupies a single unit expansion slot on IBM-PC input/output (I/O) channel 310. I/O channel 310 is coupled with direct memory access (DMA) transfer bus 322 via I/O channel interface 354 and with control bus 334 via I/O channel interface 356. DMA transfer bus 322 comprises address bus 314 and data bus 312 which are used for the transfer of data between the dual X.25 interface circuit and the IBM-PC system board. Addresses appearing on I/O channel 310 are decoded to select ports contained on LAPB controllers 306 or 308 or ports addressable via control bus 334.

Data control information is stored in buffer storage 20, which has a capacity of eight kilobytes. The IBM-PC system board accesses buffer storage 320 via I/O channel 310. LAPB controllers 306 and 308 also access data and control information contained in buffer storage 320.

Table 1 contains the address map for the dual X.25 interface circuit. The port and memory addresses in the table are in hexadecimal notation.

DMA transfer bus 322 comprises address bus 324 and data bus 326. DMA transfer bus 322 interconnects LAPB controllers, 306 and 308, buffer storage 320, and I/O channel 310. Address bus 324 comprises sixteen bits; data bus 326 comprises eight bits. Addresses appearing on I/O channel 310 are decoded, enabling the least significant sixteen bits onto address bus 324. This address is used to select a location in buffer storage 320. LAPB controllers 306 and 308 may also enable an address onto address bus 324 to access a location in buffer storage 320.

The IBM-PC system board or either of LAPB Controllers 306 or 308 may execute read or write bus cycles on DMA transfer bus 322. Addresses generated by the IBM-PC system board are transmitted onto I/O channel 310 and enabled onto address bus 324. Bus arbiter 328, comprising field programmable logic sequencers, receives all requests to access DMA transfer bus 322. Bus arbiter 328 grants access to DMA transfer bus 322 to the highest priority requesting device when DMA transfer bus 322 becomes idle.

A request to access DMA transfer bus 322 is held pending by bus arbiter 328 until the request has been satisfied. The address and data for a pending request is not enabled onto DMA transfer bus 322 until the requester has been granted access to the bus. No more than one request is held pending for each priority level of requester. Access to DMA transfer bus 322 is granted to requesters according to the following priorities: I/O channel 310, first priority; LAPB controller 306 Channel 0, second priority; and LAPB controller 308 Channel 1, third priority. Lines 358, 360, and 362 are used by bus arbiter 328 to effectuate access control.

LAPB controllers 306 and 308 transmit and receive serial data in the HDLC format according to the X.25 LAPB protocol standard. LAPB controllers 306 and 308 are implemented, for example, using two Western Digital WD2511 X.25 Packet Network Interface (LAPB) integrated circuits.

LAPB controllers 306 and 308 generate and respond to all level 2 commands and responses as specified in the X.25 protocol standard. The IBM-PC system board controls each of the HDLC links by a set of ports, located in each of the LAPB controllers. The ports are accessed via DMA transfer bus 322. Each LAPB controller generates an interrupt upon receiving a level 2 acknowledgment of a transmitted frame, receipt of an error-free frame, or upon the occurrence of an error condition. Each LAPB controller, contains an interface to DMA transfer Bus 322. Each LAPB controller transfers data to or from the buffer storage 320 via data bus 326 using the direct memory access capability of the WD2511 integrated circuit.

The transmit and receive serial data signals for LAPB controllers 306 and 308 may be clocked either by an internal or external clock source. The dual X.25 interface circuit employs internal clocking provided by clock generator 330 to which clock source 332 is connected.

Buffer storage 320 contains eight kilobytes of static random access memory which is accessed by DMA transfer bus 322. Buffer storage 320 is located between I/O channel 310 addresses 80000-81FFF hexadecimal, as shown in Table 1. Buffer storage is accessed by the IBM-PC system board by placing the least-significant sixteen bits of the I/O channel 310 address, which is between 0000 and 1FFF hexadecimal, onto DMA transfer bus 322.

Control bus 334 comprises eight-bit data bus 338 and two-bit address bus 336. Data bus 338 interconnects status port 316, control port 318, clock generator 330, with I/O channel 310. Addresses appearing on I/O channel 310 are decoded by channel interface 356, enabling the data onto control bus 334.

Clock generator 330 provides transmit and receive clock signals for LAPB controllers 306 and 308 via line 344. The input clock frequency to clock generator 330 is 1.008 megahertz, provided by clock source 332 via line 364. Clock generator 330 may be implemented using the Intel 8253-5 Programmable Interval Timer integrated circuit, or an equivalent. Clock generator 330 is controlled by four ports which are accessed by I/O channel 310 addresses 002A0-002A3 hexadecimal, as shown in Table 1.

Control port 318 provides input modem control signals for serial channels 302 and 304 via line 346. Control port 318 may reset interrupts caused by a change in state of the input modem control signals. Control port 318 is a write-only port; its bits are set to zero upon Reset. Control port 318 is accessed by a write to location 002A4 hexadecimal on I/O channel 310. The bits of control port 318 are defined in Table 2.

Status port 316 provides status information to the IBM-PC system board concerning the dual X.25 interface circuit. An interrupt generated by either of the X.25 serial channels, 302 or 304, or a change in state of the modem control signal for either of these channels is transmitted to status port 316 via line 348; the occurrence of such event causes an interrupt (IRQ3) to be generated on I/O channel 310. Status port 316 is a read-only port and is accessed by reading location 002A5 hexadecimal on I/O Channel 310. The bits of status port 316 are defined in Table 3.

Interrupts from the dual X.25 interface circuit to the IBM-PC system board may be caused by any one of four events. Either LAPB controller 306 or 308 may generate an interrupt indicating that an error-free packet was received, a transmitted packet was acknowledged, or the presence of an error condition. A change in state of the input modem control signal for either channel also will cause the generation of an interrupt by the corresponding LAPB controller. Since these two types of interrupts are physically distinct and each interrupt may be generated by either LAPB controller, four separate interrupts may occur. These four interrupts are combined to form a single interrupt (IRQ3) to the IBM-PC system board.

Serial interface 340 and 342 provide electrical conversion of modem control signals and serial data signals between LAPB controllers 306 and 308 and serial data communication channels 302 and 304, respectively. Each serial interface converts TTL-level signals received from the LAPB controllers to EIA RS-423 signals which are presented to the serial data communications channels.

Serial interface 340 for channel 302 may be configured as a DTE or a DCE by setting the appropriate configuration switches; likewise, interface 342 for channel 304 may be configured as a DTE or DCE. Tables 4 and 5 contain the configuration switch settings for X.25 serial channels 302 and 304, respectively. The following are the signals provided for each serial data communication channel: Transmit Data, Receive Data, Request To Send, Clear To Send, Data Terminal Ready, Data Set Ready, Transmit Clock, and Receive Clock.

Serial interfaces 340 and 342 provide both internal and external clocking for the X.25 Ports and for serial data communications channels 302 and 304. The switch settings for the respective channels such internal and external clocking are defined in Tables 4 and 5.

Table 6 contains the signals available on IBM-PC I/O channel 310 which are used by the dual X.25 interface circuit.

TABLE 1

I/O Channel 310 Address Map

| Address | Name |
|---------|------|
| 00200 | Channel 0 CR0 |
| 00201 | Channel 0 CR1 |
| 00202 | Channel 0 SR0 |
| 00203 | Channel 0 SR1 |
| 00204 | Channel 0 SR2 |
| 00205 | Channel 0 ER0 |
| 00206 | Channel 0 CHAIN MONITOR |
| 00207 | Channel 0 RECEIVED C-FIELD |
| 00208 | Channel 0 T1 |
| 00109 | Channel 0 N2/T1 |
| 0010A | Channel 0 TLOOK HI |
| 0010B | Channel 0 TLOOK LO |
| 0020C | Channel 0 CHAIN/LIMIT |
| 0010D | Channel 0 NOT USED |
| 0010E | Channel 0 XMIT COMMAND E |
| 0020F | Channel 0 RESPONSE F |
| 00290 | Channel 1 CR0 |
| 00291 | Channel 1 CR1 |
| 00292 | Channel 1 SR0 |
| 00293 | Channel 1 SR1 |
| 00294 | Channel 1 SR2 |
| 00295 | Channel 1 ER0 |
| 00296 | Channel 1 CHAIN MONITOR |
| 00297 | Channel 1 RECEIVED C-FIELD |
| 00298 | Channel 1 T1 |
| 00299 | Channel 1 N2/T1 |
| 0029A | Channel 1 TLOOK HI |
| 0029B | Channel 1 TLOOK LO |
| 0029C | Channel 1 CHAIN/LIMIT |
| 0029D | Channel 1 NOT USED |
| 0029E | Channel 1 XMIT COMMAND E |
| 0029F | Channel 1 RESPONSE F |
| 002A0 | Clock Generator-Counter 0 |
| 002A1 | Clock Generator-Counter 1 |
| 002A2 | Clock Generator-Counter 2 |
| 002A3 | Clock Generator-Control Word |
| 002A4 | Control Port |
| 002A5 | Status Port |
| 80000- | Buffer Storage, First Byte |
| 81FFF | Buffer Storage, Last Byte |

Notes:
Channel 0 = LAPB Controller 306
Channel 1 = LAPB Controller 308
Addresses are in Hexadecimal

TABLE 2

Control Port 318 Bit Descriptions

| Bit | Description |
|-----|-------------|
| 7 | Channel 0 - MODEM CONTROL SIGNAL - If bit 1 of status port 316 is set to zero, bit 7 is the Data Terminal Ready (DTR) modem control bit for Channel 0. If bit 1 of status port 316 is set to one, bit 7 is the Data Set Ready (DSR) modem control bit for Channel 0. Setting bit 7 to a logical one sets the appropriate DTR/DSR bit of either serial interface 340 or 342 to a logical one. |
| 6 | Channel 1 - MODEM CONTROL SIGNAL - If bit 0 of status port 316 is set to zero, bit 6 is the Data Terminal Ready (DTR) modem control bit for channel 1. If bit 0 of status port 316 is set to one, bit 6 is the Data Set Ready (DSR) modem control bit for channel 1. Setting bit 6 to a logical one sets the appropriate DTR/DSR bit of either serial interface 340 or 342 to a logical one. |
| 5 | Unused |
| 4 | Unused |
| 3 | BIT 5 RESET - Setting bit 3 to zero clears an interrupt caused by bit 5 of status port 316. Setting bit 3 to one, enables interrupts caused by bit 5 of status port 316. |
| 2 | BIT 4 RESET - Setting bit 4 to zero clears an interrupt caused by bit 4 of status port 316. Setting this bit 4 to one, enables interrupts caused by bit 4 of status port 316. |
| 1 | Unused |
| 0 | Unused |

Notes:
Channel 0 = LAPB Controller 306
Channel 1 = LAPB Controller 308

TABLE 3

Status Port 316 Bit Descriptions

| Bit | Description |
|-----|-------------|
| 7 | Channel 0 - INTERRUPT - If an interrupt is generated by Channel 0, this bit is set to one. This bit is reset after Channel 0 Status Register 1 is read. |
| 6 | Channel 1 - INTERRUPT - If an interrupt is generated by Channel 1, this bit is set to one. This bit is reset after Channel 1 Status Register 1 is read. |
| 5 | Channel 0 - MODEM CONTROL SIGNAL - If bit 1 of status port 316 is set to zero, this bit is the Data Set Ready (DSR) modem control bit for Channel 0. If bit 1 of status port 316 is set to one, this bit is the Data Terminal Ready (DTR) modem control bit for Channel 0. A change in state of this bit, generates an interrupt (IRQ3) on I/O channel 310. |
| 4 | Channel 1 - MODEM CONTROL SIGNAL - If bit 0 of status port 316 is set to zero, this bit is the Data Set Ready (DSR) modem control bit for Channel 1. If bit 0 of status port 316 is set to one, this bit is the Data Terminal Ready (DTR) modem control bit for channel 1. A change in state of this bit, generates an interrupt (IRQ3) on I/O channel 310. |
| 3 | Channel 0 - INTERNAL/EXTERNAL CLOCKING - If this bit is set to one, Channel 0 transmit and receive data is clocked by an external clock source. If this bit is set to zero, Channel 0 transmit and receive data is clocked by an internal clock source, such as clock generator 330. |
| 2 | Channel 1 - INTERNAL/EXTERNAL CLOCKING - If this bit is set to one, Channel 1 transmit and receive data is clocked by an external clock source. If this bit is set to zero, Channel 1 transmit and receive data is clocked by an internal clock source, such as clock generator 330. |
| 1 | Channel 0 - DTE/DCE - If this bit is set to zero, Channel 0 is configured as a DTE. If this bit is set to one, Channel 0 is configured as a DCE. |
| 0 | Channel 1 - DTE/DCE - If this bit is set to zero, Channel 1 is configured as a DTE. If this bit is set to one, Channel 1 is configured as a DCE. |

Notes:
Channel 0 = LAPB Controller 306
Channel 1 = LAPB Controller 308

TABLE 4

Configuration Switch Setting for Channel 0, Serial Channel 302

Switch 1 - SW1:

| | |
|---|---|
| 1 | Transmit Data, DCE Configuration |
| 2 | Transmit Data, DTE Configuration |
| 3 | Receive Data, DCE Configuration |
| 4 | Receive Data, DTE Configuration |
| 5 | Request-To-Send, DCE Configuration |
| 6 | Clear-To-Send, DTE Configuration |
| 7 | Clear-To-Send, DCE Configuration |
| 8 | Request-To-Send, DTE Configuration |

Switch 2 - SW2:

| | |
|---|---|
| 1 | Data-Terminal-Ready, DCE Configuration |
| 2 | Data-Set Ready, DTE Configuration |
| 3 | Data-Set-Ready, DCE Configuration |
| 4 | Data-Terminal-Ready, DTE Configuration |
| 5 | Clear-To-Send enable, DCE Configuration |
| 6 | Request-To-Send enable, DCE Configuration |
| 7 | Request-To-Send enable, DTE Configuration |
| 8 | OFF: Channel 0 is DTE<br>ON: Channel 0 is DCE |

Switch 3 - SW3:

| | |
|---|---|
| 1 | Transmit Clock - External or Internal |
| 2 | Internal Transmit Clock |
| 3 | Receive Clock - Internal or External |
| 4 | Internal Receive Clock |
| 5 | OFF: Channel 0 is externally clocked<br>ON: Channel 0 is internally clocked |
| 6 | Unused |
| 7 | Unused |
| 8 | Unused |

TABLE 5

Configuration Switch Settings For Channel 2, Serial Channel 304

Switch 4 - SW4:

| | |
|---|---|
| 1 | Transmit Data, DCE Configuration |
| 2 | Transmit Data, DTE Configuration |
| 3 | Receive Data, DCE Configuration |
| 4 | Receive Data, DTE Configuration |
| 5 | Request-To-Send, DCE Configuration |
| 6 | Clear-To-Send, DTE Configuration |
| 7 | Clear-To-Send, DCE Configuration |
| 8 | Request-To-Send, DTE Configuration |

Switch 5 - SW5:

| | |
|---|---|
| 1 | Data-Terminal-Ready, DCE Configuration |
| 2 | Data-Set-Ready, DTE Configuration |
| 3 | Data-Set-Ready, DCE Configuration |
| 4 | Data-Terminal-Ready, DTE Configuration |
| 5 | Clear-To-Send enable, DCE Configuration |
| 6 | Request-To-Send, enable DCE Configuration |
| 7 | Request-To-Send, enable DTE Configuration |
| 8 | OFF: Channel 1 is DTE<br>ON: Channel 1 is DCE |

Switch 6 - SW6:

| | |
|---|---|
| 1 | Transmit Clock - External or Internal |
| 2 | Internal Transmit Clock |
| 3 | Receive Clock - Internal or External |
| 4 | Internal Receive Clock |
| 5 | OFF: Channel 1 is externally clocked<br>ON: Channel 1 is internally clocked |
| 6 | Unused |
| 7 | Unused |
| 8 | Unused |

TABLE 6

Signals Used By Dual X.25 Board

| Signal | Status |
|---|---|
| A0-A19 | Active High |
| D0-D7 | Active High |
| I/O CH RDY | Active High |
| ALE | Active High |
| IRQ3 | Active High |
| CLOCK | |
| IOR* | Active Low |
| IOW* | Active Low |
| MEMR* | Active Low |
| MEMW* | Active Low |
| DACKO* | Active Low |
| RESET DRV | Active High |
| GND | |
| +5 V | |
| +12 V | |
| -12 V | |

HOST SECURITY DEVICE SOFTWARE

The software for HSD-42 is executable on the IBM-PC. The software comprises two major parts. The first part provides for establishing and maintaining the user identification code file, which hereinafter may be referred to as the User-ID file. This file contains the current list of authorized user identification codes. This list is used for authenticating the identity of a user who has requested access to a database of host 24, e.g., see decision blocks 120 and 192. The second part of the software provides for control of the dual X.25 interface circuit shown in FIG. 9. This part provides for receiving, processing, and retransmitting communications traffic between network 22 and host 24 in conformance with the X.25 level 3 protocol standard. It also provides for intercepting incoming call packets from network 22 and for requiring each user to provide a valid user identification code as a condition precedent to the user's gaining access to a database of host 24.

X.25 level 3 processing comprises passing packets between host 24 and network 22 in conformance with the protocol standard. Except for incoming call packets, packets containing user identification codes, and request clear packets, the packets are passed between the two X.25 ports without program alteration. In FIG. 9, one of the serial communications channels, 302 or 304, is connected to host 24 and the other channel is connected to network 22. Table 7 shows the processing by HSD 42 on the various types of packets received from host 24, and Table 10 shows the processing by HSD 42 on the various types of packets received from network 22.

Controlling the two X.25 ports includes proper initialization of the two LAPB Controllers, 306 and 308, and clock generator 330; establishing and maintaining buffers in buffer storage 320 for storing packets; and monitoring the status of the dual X.25 interface circuit via status bus 334.

Validation of the user identification code occurs on receipt by HSD 42 of the first data packet following a call request packet from the user. This first data packet, transmitted by TSD 44, contains the user identification code which is encoded in the tangible medium provided by the user. The received user identification code is compared to the list of authorized user identification codes in the User-ID file. If a matching code is found in the file, the user identification code is deemed to be valid and processing proceeds. If a matching code is not found in the file on the first attempt, the user identification code is deemed to be invalid and the logical channel or virtual circuit between the user and host 24 is cleared.

Figure 10:
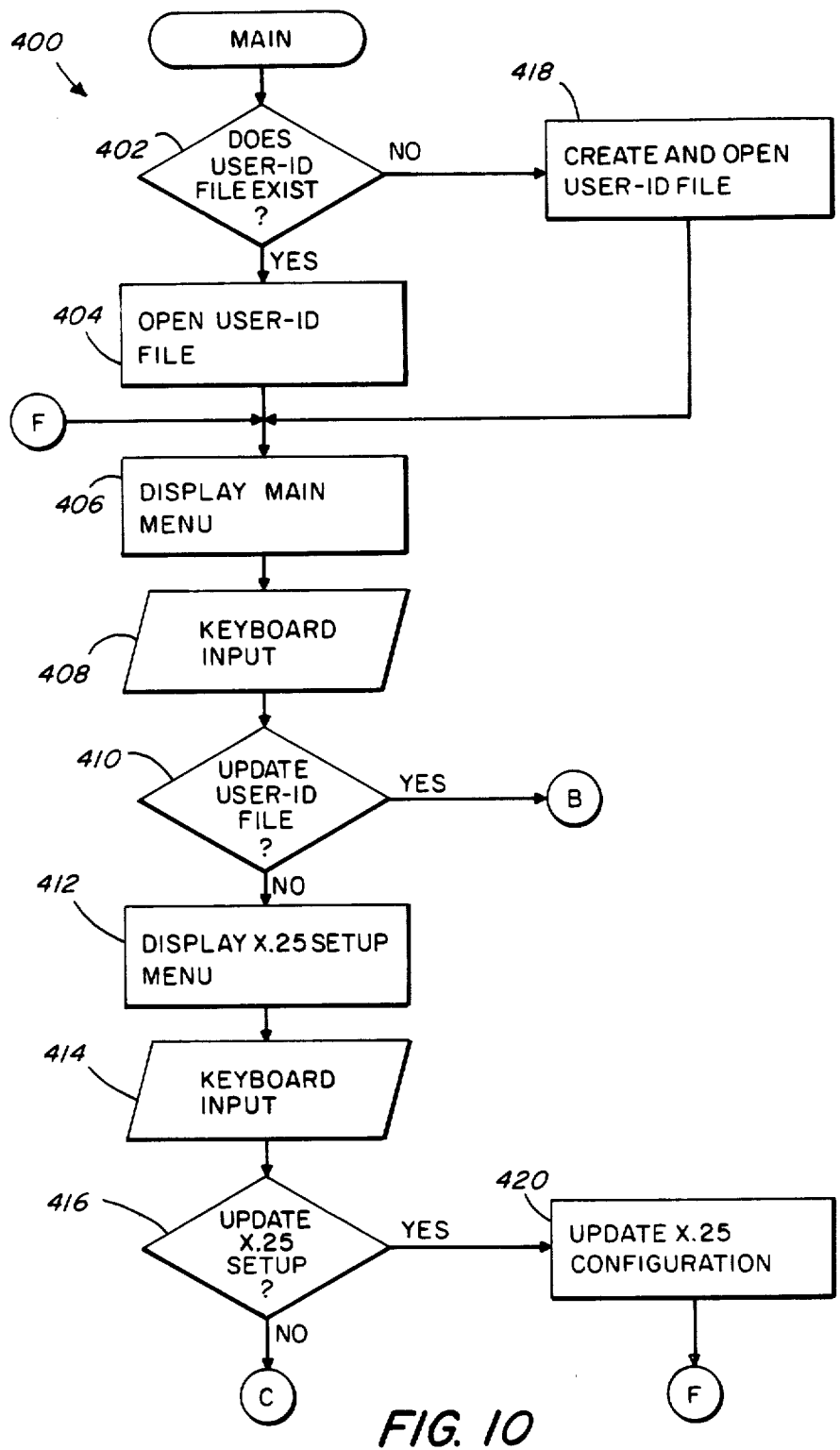
FIGS. 10–15 contain a functional flowchart of the software of the host security device.

FIGS. 10-15 contain a functional flowchart of the software of HSD 42. When HSD 42 is operational, the software will perform security checking as required while maintaining the traffic on both X.25 interfaces in real time. Processing control is achieved primarily through interrupts generated in response to communications traffic between network 22 and host 24 in either direction. FIG. 10 describes the start-up of the main program. In decision block 402, it is determined whether or not the User-ID file has been created. If the file does not exist, it is created in processing block 418; the file remains open for further processing. If the file already exists, it is opened for processing in block 404. The main menu is displayed in block 406. The main menu includes two options. The first option is that of updating the User-ID file; the second option is to perform the real-time operational responsibilities of host 24. Keyboard entry is made in block 408 and tested in decision block 410. If the entry requires updating the User-ID file, program control branches to connector B. Otherwise, the program continues to block 412 wherein the X.25 setup menu is displayed. This menu provides means for initializing or modifying operational parameters which are required for the definition of the characteristics of X.25 channels 302 and 304. An appropriate keyboard entry is made in block 414 and tested in decision block 416. If required, the X.25 configuration is updated in block 420; thereafter program control reverts through connector F to block 406. If an X.25 configuration update is not required in block 416, program control passes via connector C to FIG. 12.

Figure 11:
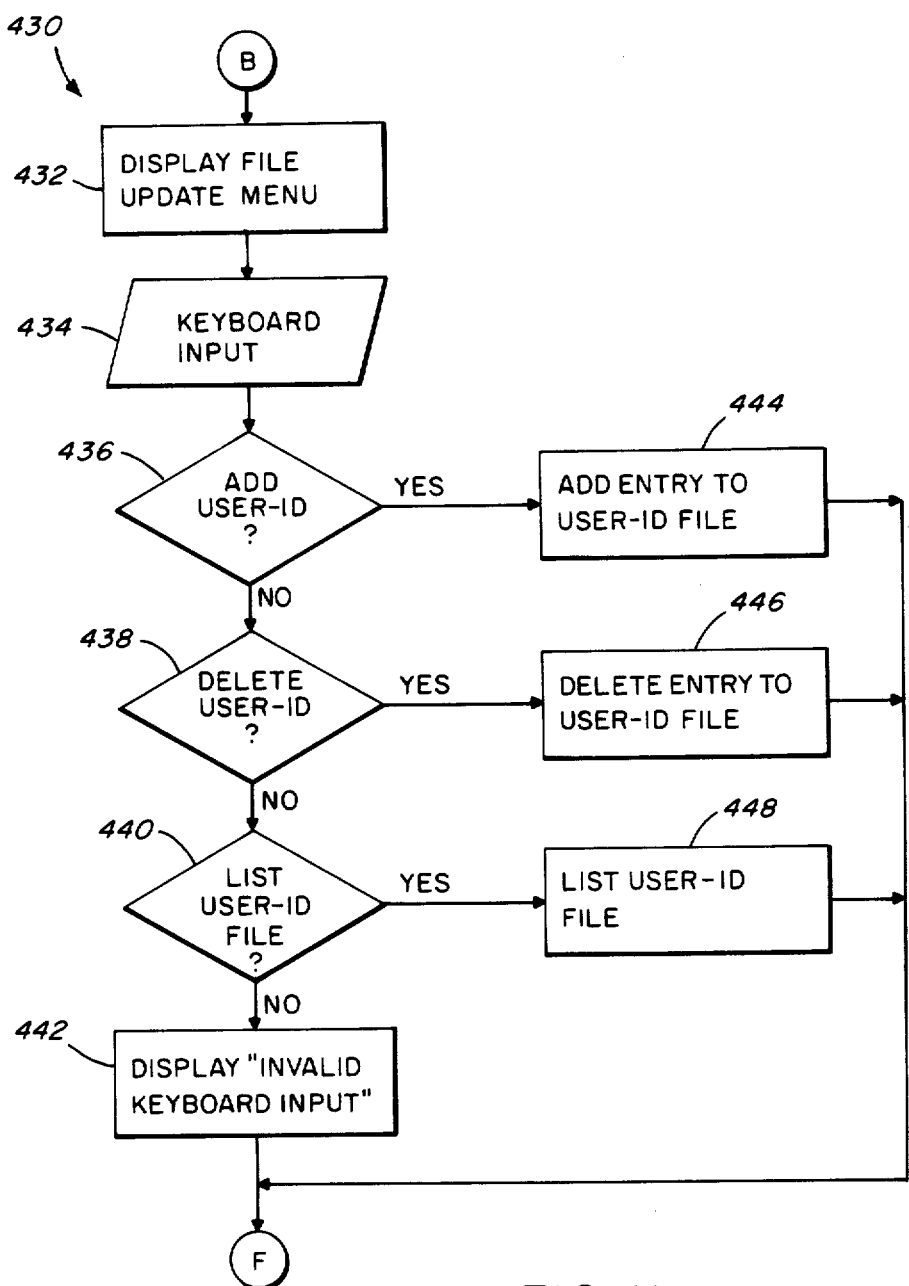

FIG. 11 describes the logic for updating the User-ID file. Program control commences with connector B and proceeds to block 432 wherein the file-update menu is displayed. The file-update menu includes three options: add a user-ID to the file; delete a user-ID from the file; or print a list of all user identification codes currently in the file. An appropriate keyboard entry is made in block 434. In decision blocks 436, 438, and 440, the keyboard entry is tested to determine which of the update options is required, and the appropriate processing is performed in block 444, 446, or 448, respectively. If none of these options was designated in block 434, an "invalid keyboard input" or an equivalent message is displayed in block 442. Program control returns through connector F to block 406 of FIG. 10.

Figure 12:
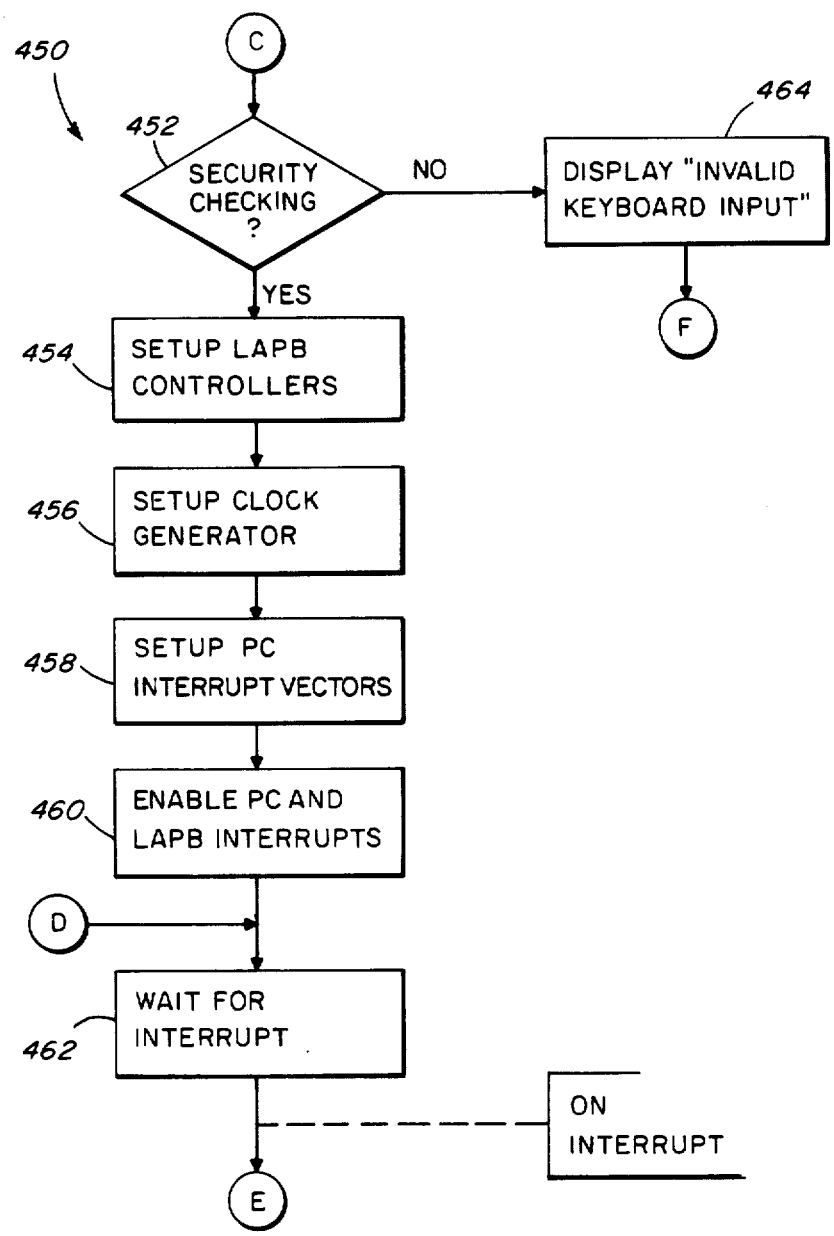

FIG. 12 describes the remaining initialization functions leading to the interrupt-processing loop. Program control commences at connector C which continues the processing of the keyboard entry made in block 414. This entry is tested in decision block 452 to determine if real-time security checking is required. Since this is the only valid option remaining, an "invalid keyboard input" or an equivalent message is displayed in block 464 in the event this option is not designated. In blocks 454–460, initialization for the interrupt- processing loop occurs. Operational parameters for LAPB controllers 306 and 308 are set in block 454. Clock generator 330 is initialized in block 456. The interrupt vectors for the personal computer are established in block 458. Lastly, interrupts are enabled in block 460 for the personal computer and LAPB controllers 306 and 308. The program cycles indefinitely within block 462 awaiting an interrupt from one of the LAPB controllers. When such an interrupt is received, program control branches to connector E.

Figure 13:
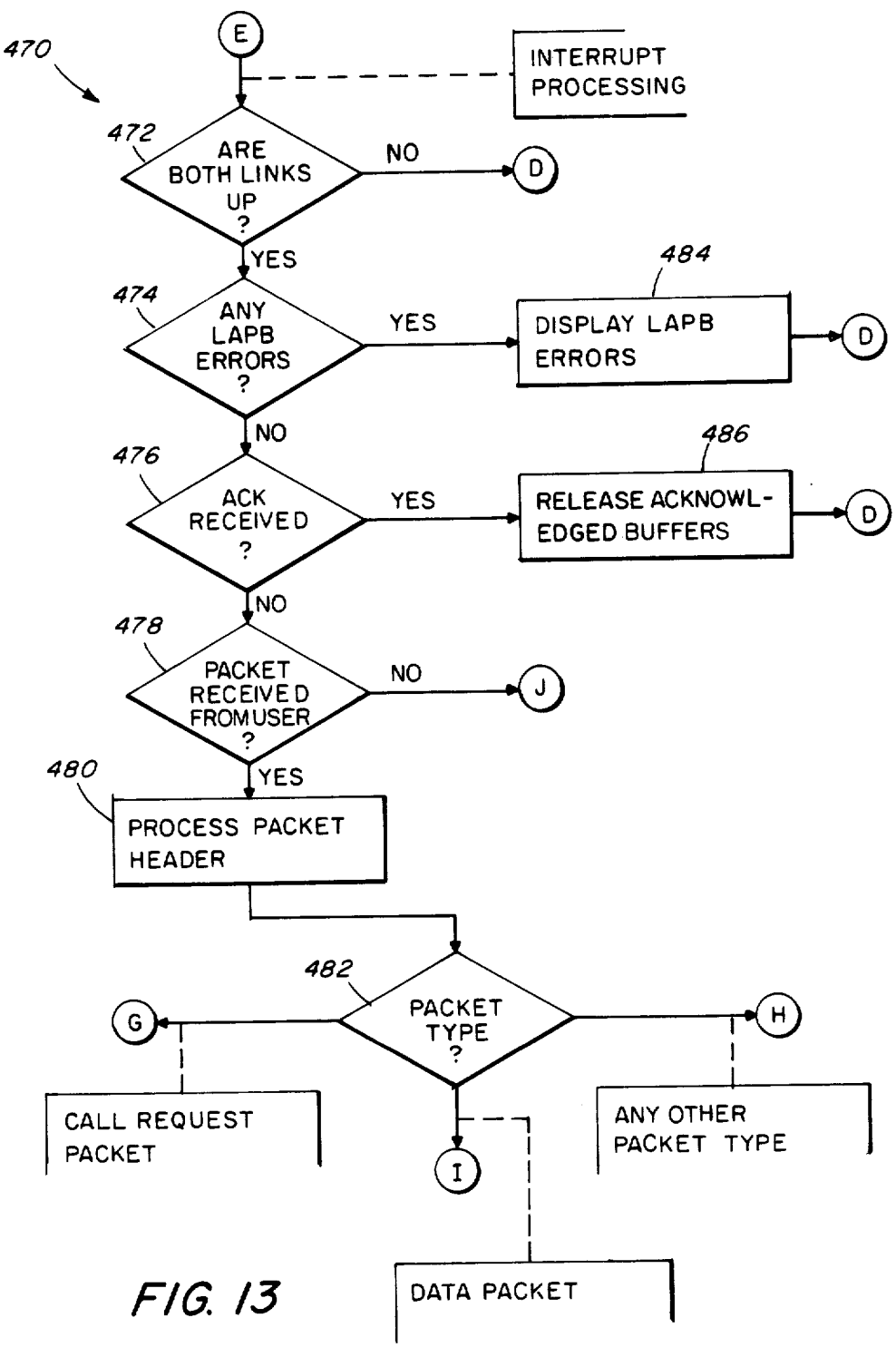

FIG. 13 describes the interrupt processing capability of the software. This process handles the interrupt IRQ3 generated by the X.25 interface circuit. There are four causes of IRQ3: a data set signal change on Channel 0, which is LAPB Controller 306; a data set signal change on Channel 1, which is LAPB controller 308; a Channel 0 interrupt; or a Channel 1 interrupt. Either of the data set interrupts indicates that a change in state of the input modem control signal has occurred in the respective channel. The channel interrupts indicate that an error-free packet has been received, a transmitted packet has been acknowledged, or an error condition has been detected by the respective LAPB controller.

In decision block 472, it is determined whether both links are operational. A link is the communications line between network 22 and HSD 42 or between HSD 42 and host 24. If either link is down, the program ignores the interrupt and returns to the main program via connector D. If both links are operational, program control passes to decision block 474 wherein it is determined whether an error condition has been detected by either LAPB controller. If so, program control branches to block 484; the error condition is displayed; and the program returns to the main program via connector D. If no error condition has been detected, the program determines in decision block 476 whether an acknowledgment packet has been received by either LAPB controller. Upon receipt of an acknowledgment, the buffer in the processor's memory corresponding to the successfully transmitted packet is released in block 486, and control returns to the main program via connector D. If an acknowledgment packet has not been received, program control passes to decision block 478 wherein it is determined whether the user or host is the sender of the received packet. If the host is the sender, control branches via connector J. If the user is the sender, the packet header is decoded and processed in block 480. In decision block 482, the packet type is determined with, as shown in the drawing, three possible outcomes. If the received packet is a call request packet, control branches to connectors G; if the received packet is a data packet, control branches to connector I; if the received packet is any other type, control branches to connector H.

Figure 14:
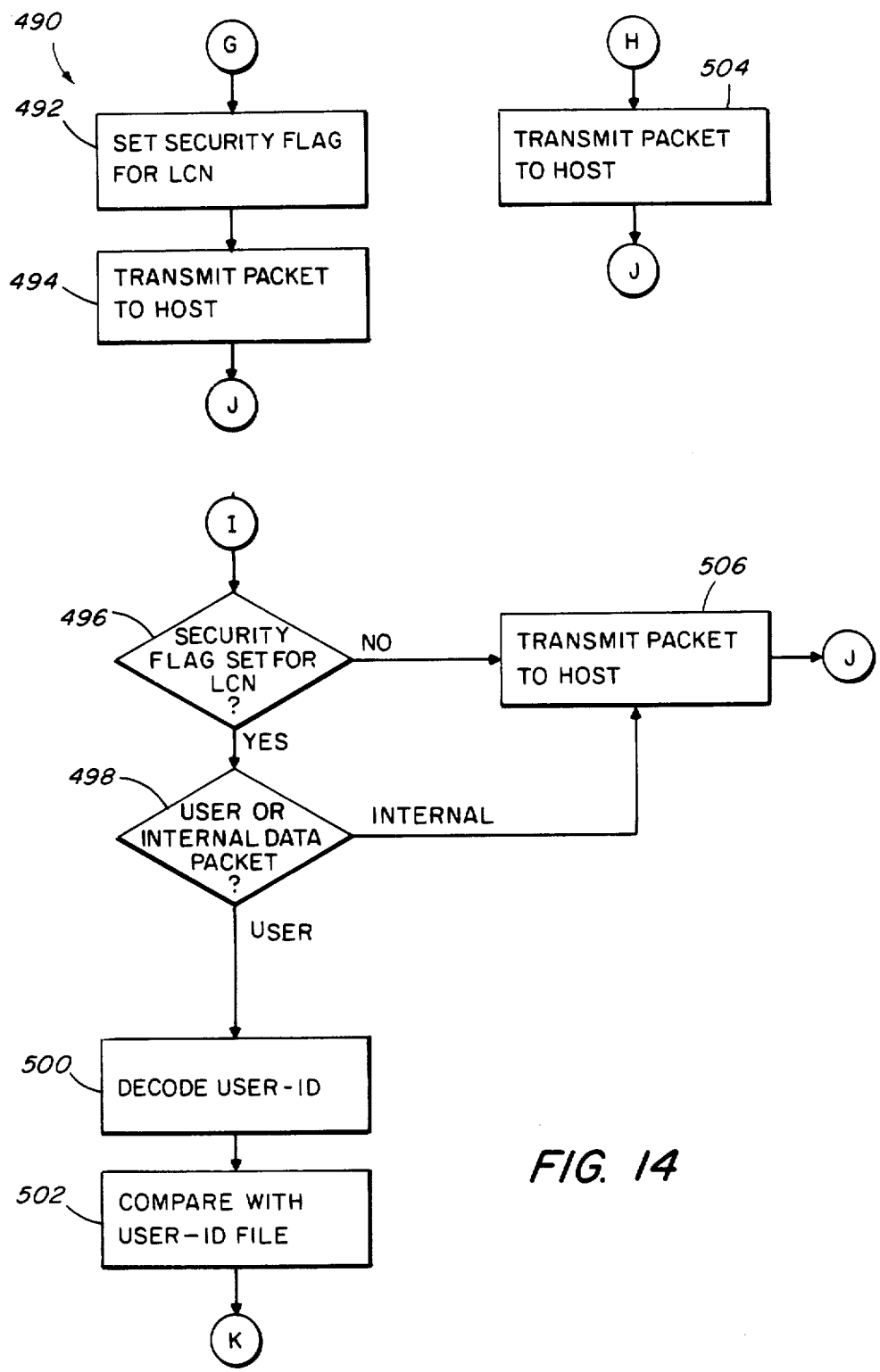

In FIG. 14, the description of interrupt processing continues. Program control originating from connector G pertains to the receipt of a call request packet from network 22. In block 492, the security flag is set for the corresponding logical channel number (LCN). The setting of the security flag signifies that the program must authenticate the identity of the user assigned to this LCN upon receipt of the next data packet from the user. In block 494, the call request packet is transmitted to host 24 and control passes to connector J. Program control originating from connector H pertains to receipt of a packet other than a call request or data packet. In this case, the packet is transmitted to host 24 and control proceeds to connector J.

Program control originating at connector I pertains to receipt of a data packet. In decision block 496, the security flag is tested. In the event the flag is not set, the packet is transmitted to host 24 in block 506 and control passes to connector J. If the flag is set, the received data packet is either an internal data packet or the first data packet of the user. The test in decision block 498 distinguishes these two possibilities. If the received packet is an internal data packet, program control branches to block 506 wherein the packet is transmitted to host 24. If the received packet is the first data packet of the user, the received packet contains the user identification code which must be tested for validity. In block 500, the User-ID is decoded. In block 502, the User-ID is compared with all entries in the User-ID file. If any entry in the file matches the User-ID, it is deemed to be valid. If no entry in the file matches, the User-ID is deemed to be invalid. Program control proceeds to connector K.

Figure 15:
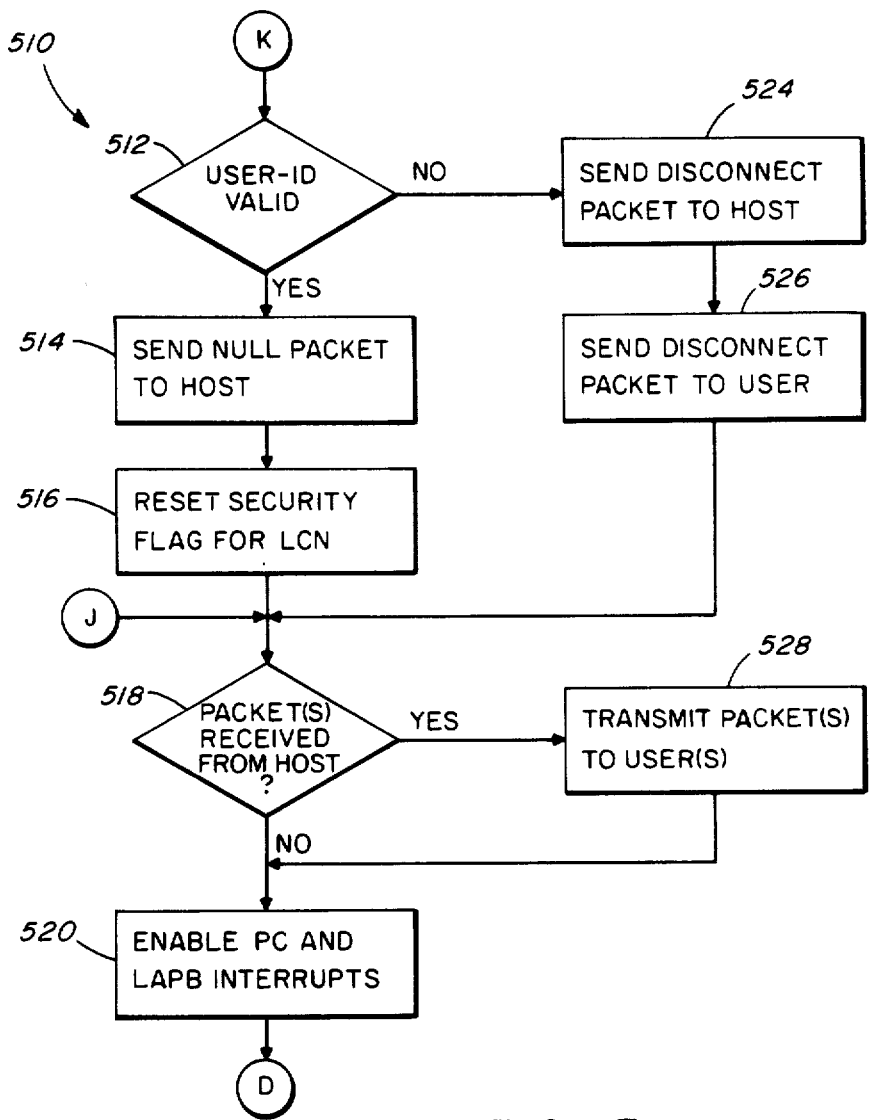

FIG. 15 describes the remainder of the interrupt processing logic. Program control from connector K proceeds to decision block 512 wherein it is determined whether the User-ID is valid or not. If invalid, a disconnect packet is transmitted to host 24 in block 524, and a separate disconnect packet is sent to the user via network 22 in block 526. The effect of either of these disconnect packets will be to clear the virtual circuit or logical channel between the user and host 24 resulting in the user's being disconnected. Program control passes to decision block 518. If the User-ID is determined to be valid in decision block 512, a null packet is sent to host 24 in block 514. The purpose of the null packet is to maintain the proper sequencing of packets under the X.25 protocol in the processor of host 24. The X.25 protocol assigns a sequence number to each packet and requires that each packet be accounted for at the receiving end. Since HSD 42 has intercepted a packet in order to validate the user identification code, the host processor will detect the absence of this packet unless a substitute packet is sent to the host in lieu of the packet containing the User-ID. This substitute, the null packet, does not interfere with the log-on procedure in progress between the user and host 24 except to adjust the sequencing counter in the host processor to account for the intercepted packet. In block 516, the security flag for this LCN is reset. Once this flag has been reset, subsequently received data packets with this logical channel number will be transmitted without alteration to host 24. Program control passes to decision block 518.

Processing commencing at decision block 518 describes the termination of interrupt processing. During the period of the interrupt processing, further interrupts were disabled. In decision block 518, the program determines whether any packets have been received from host 24 during the processing of the interrupt and, if so, these packets are transmitted to the respective users in block 528. In block 520, the personal computer and LAPB controller interrupts are enabled. Program control returns to the main program via connector D.

TABLE 7

| Packets Received from Host 24 | |
|---|---|
| Packet Type | Processing by HSD-42 |
| Call request | Logical channel number set active and packet transferred to network 22 |
| Call accepted | Packet to network 22 |
| Clear request | Logical channel number set inactive and packet to network 22 |
| Clear confirmation | Packet to network 22 |
| Data | Packet to network 22 |
| Interrupt | Packet to network 22 |
| Interrupt confirmation | Packet to network 22 |
| RR (modulo 8) | Packet to network 22 |
| RNR (modulo 8) | Packet to network 22 |
| REJ (modulo 8) | Packet to network 22 |
| Reset Request | Packet to network 22 |
| Reset confirmation | Packet to network 22 |
| Restart request | Packet to network 22 |
| Restart confirmation | Packet to network 22 |

TABLE 8

| Packets Received from Network 22 | |
|---|---|
| Packet Type | Processing by HSD-42 |
| Incoming Call | Logical channel number held pending and packet transferred to host 24 |
| Call connected | Packet to host 24 |
| Clear indication | Logical channel number set inactive and packet to host 24 |
| Clear confirmation | Packet to host 24 |
| First data packet after user connection with host 24 | User identification code validated and no transfer of data packet; if validated logical channel number set active with null packet sent to host 24; if invalid, logical channel number set inactive and virtual circuit between user and host 24 is cleared |
| Data (second or subsequent) | Packet to host 24 |
| Interrupt | Packet to host 24 |
| Interrupt confirmation | Packet to host 24 |
| RR (modulo 8) | Packet to host 24 |
| RNR (modulo 8) | Packet to host 24 |
| Reset request | Packet to host 24 |
| Reset confirmation | Packet to host 24 |
| Restart request | Packet to host 24 |
| Restart confirmation | Packet to host 24 |

TERMINAL SECURITY DEVICE HARDWARE

As shown in FIGS. 2 and 4, TSD 44 is a separate component located at the same site as terminal 28. In a preferred embodiment of the invention, TSD 44 is connected to an auxiliary data port on terminal 28, as shown in FIG. 4.

The terminal security device has four principal functions. The first function is to sense or read a host address and user identification code, both of which are encoded in a tangible medium. In a preferred embodiment, the host address end user identification codes are encoded on a magnetic stripe affixed to a plastic card. The second function is to transmit and receive automatically such information from network 22 as required for establishing a connection between the terminal associated with the terminal security device and the host designated in the host address read from the card. The third function is to transmit the user identification code through network 22 with host 24 as addressee in accordance with an appropriate protocol whereby HSD 42 will intercept this message. The fourth function is to enter a transparent state after transmission of the user identification code such that all communications between terminal 28 and network 22 may proceed without intervention by terminal security device 44; see FIG. 3.

Figure 16:
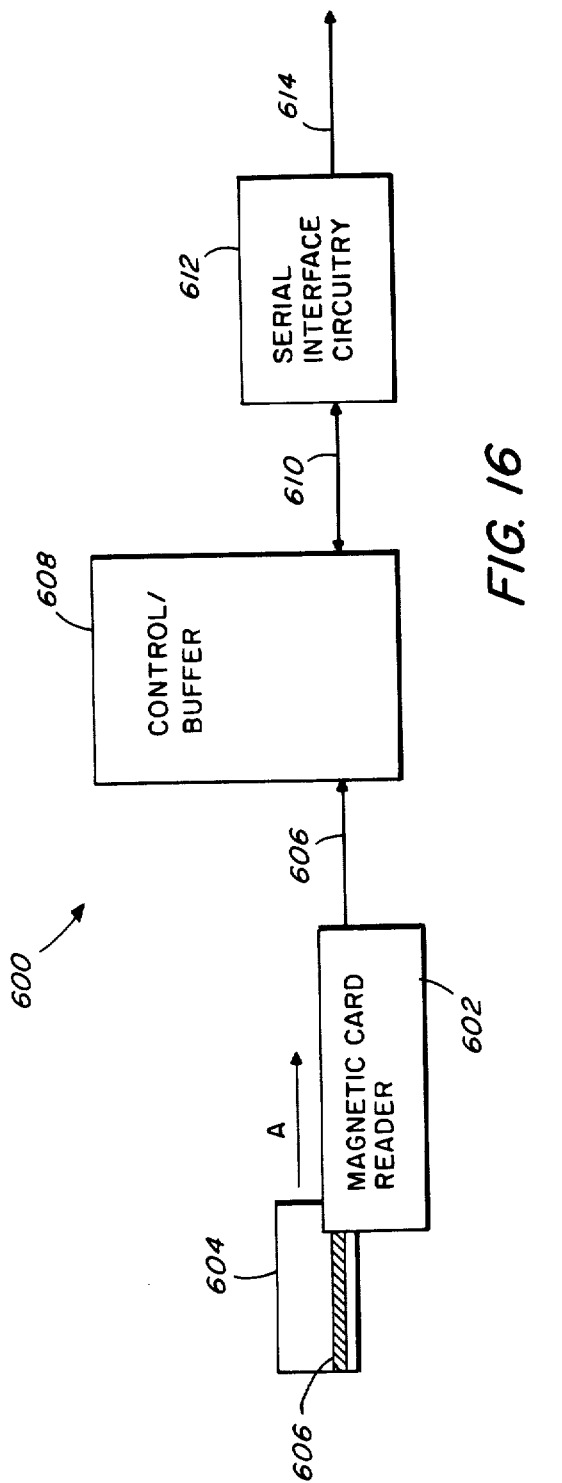
FIG. 16 is a functional block diagram of the terminal security device.

FIG. 16 is a functional block diagram 600 of a preferred embodiment of TSD 44. Card 604 has a magnetic stripe 606 affixed to the card. A host address and user identification codes are magnetically encoded in magnetic stripe 606. The user initiates a connection with host 24 by engaging card 604 with card reader 602. When card 604 is moved through card reader 602, say in the direction indicated by arrow A in the drawing, the host address and user identification codes are read by card reader 602 and transmitted via line 606 to control/buffer means 608. An example of an acceptable magnetic stripe card reader is SRD, Part No. 494495050. Control/buffer means 608, which may be a microcomputer, is coupled with terminal 28 and network 22 through interface circuitry 612 and serial input-/output lines 610 and 614.

Figure 17:
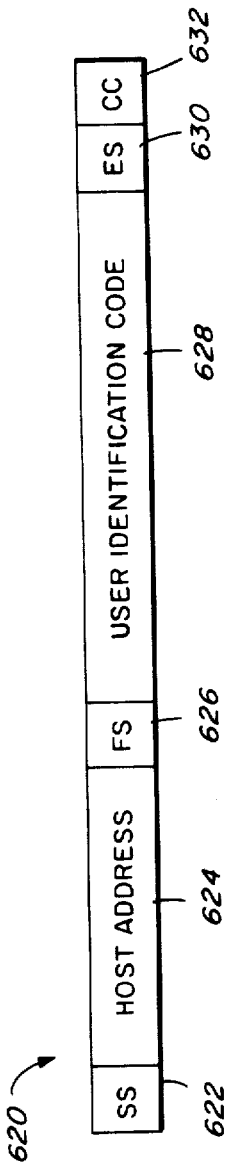
FIG. 17 shows the field definitions of the data message sent by the magnetic card reader to the microcomputer in the terminal security device, such field definitions being in conformance with the American Bankers' Association Track 2 Standard.

Stripe 606 has data magnetically encoded on it in conformance with the American Bankers' Association (ABA) Track 2 Standard. This format is shown in FIG. 17. Card reader message 620 comprises six fields as follows: field 622, labelled "SS," contains the ABA Track 2 Start Sentinel Character; field 624 contains the host address; field 626, labelled "FS," contains the ABA Track 2 Field Separator Character; field 628 contains the user identification code; field 630, labelled "ES," contains the ABA Track 2 End Sentinel Character; and field 632, labelled "CC," contains the ABA Track 2 Check Character.

Figure 18:
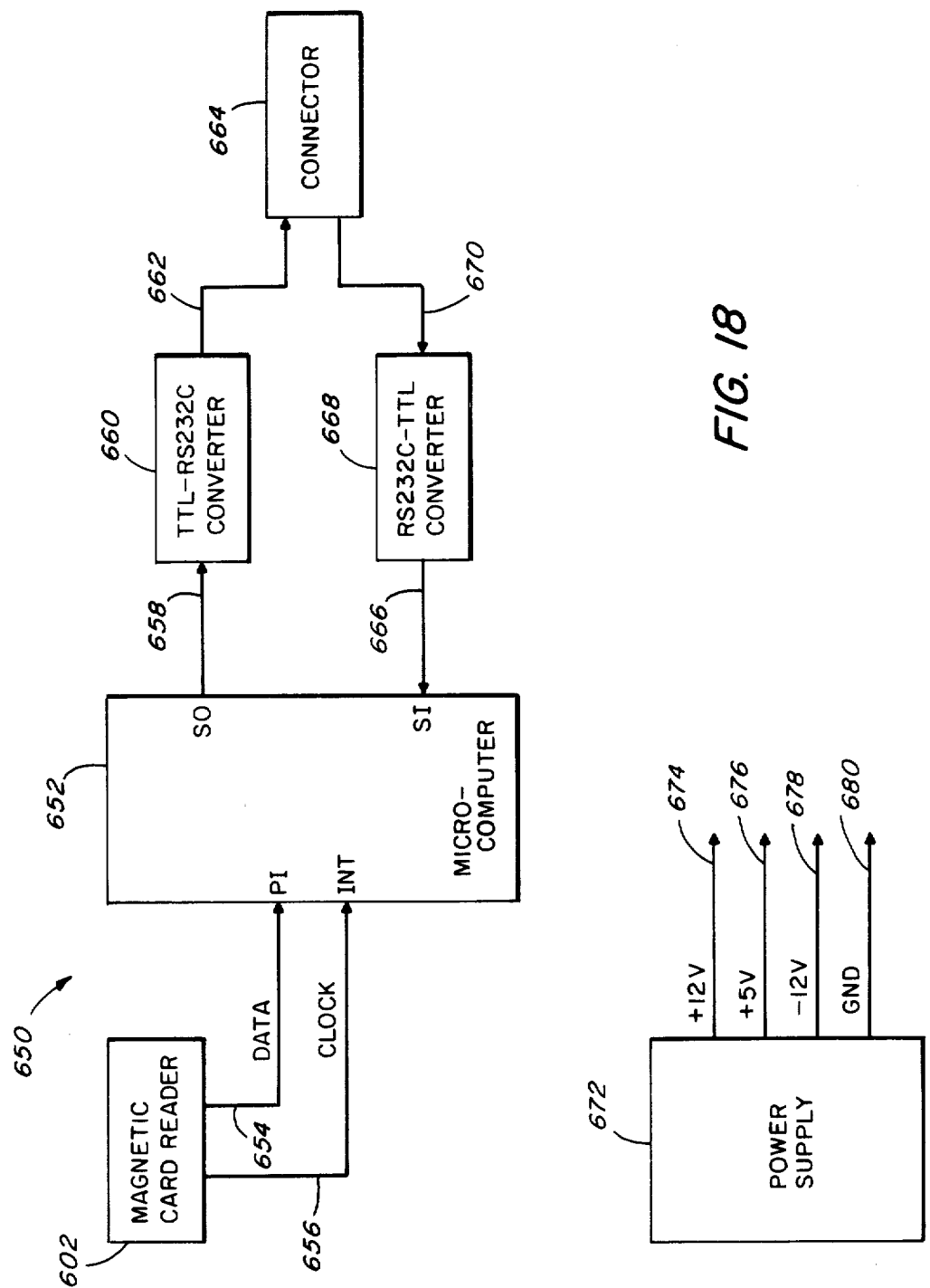
FIG. 18 contains a block diagram showing components of the terminal security device.

FIG. 18 shows a detailed design 650 of TSD 44. In order to minimize cost, single-chip microcomputer 652 is employed as control/buffer means 608. Examples of existing single-chip microcomputers which may be utilized are Intel 8051, Motorola 6801, Rockwell 6511, and Hitachi 6301. Microcomputer 652 incorporates read-only program memory (ROM), random-access data memory (RAM), parallel input/output, serial input-/output, interrupt input, and control capability all within the single component.

Data is transmitted from card reader 602 to microcomputer 652 via input line 656, labelled "Data" in the drawing. In addition, card reader 602 generates a clock pulse on line 656, labelled "Clock," for each bit transmitted. The clock pulse interrupts the program in microcomputer 652, causing the program to cease its current processing and to record the bit transmitted by card reader 602. The "PI" and "INT" labels in the drawing indicate the parallel input and interrupt input pins, respectively, of microcomputer 652. Utilization of the interrupt permits microcomputer 652 to perform two independent functions concurrently; namely, receipt of data from card reader 602, and protocol control and transmission to network 22 via the serial input-output ports of microcomputer 652.

Microcomputer 652 has serial output line 658, labelled "SO" in the drawing, which is coupled with connector 664 through transistor-transistor logic (TTL) to RS-232C converter 660 and line 662. Similarly, serial input line 666, labelled "SI," of microcomputer 652 is coupled with connector 664 through RS232C to TTL converter 668 and line 670. This interface circuitry provides means for communications between TSD 44 and terminal 28. Connector 664 may be connected to an auxiliary data port of terminal 28.

Power supply 672 for the terminal security device has four voltage output levels as shown in the drawing: +12 volts on line 674; +5 volts on line 676; -12 volts on line 678; and zero volts or ground, labelled "GND," on line 680.

In order to implement these functions, microcomputer 652 contains program instructions stored in its program memory. The data from card reader 602 during data entry is stored or buffered in the data memory of microcomputer 652. FIG. 6 describes a TSD/HSD protocol appropriate for a data communications system without password security. FIG. 8 describes a TSD/HSD protocol appropriate for a data communications system with password security. In both FIGS. 6 and 8, the data communications systems include security apparatus in accordance with the invention; and the level of security in both cases includes authentication of the user identification code provided by the user.

TERMINAL SECURITY DEVICE SOFTWARE

The terminal security device implements and controls the following functions. As data is received from card reader 602, it is stored in the data memory of microcomputer 652. Upon completion of data entry from card reader 602, microcomputer 652 receives and sends the host address to network 22 on its serial input and output lines in order to establish a connection between terminal 28, associated with TSD 44, and the host designated in the host address, e.g., host 24. Upon detection of the host's first prompt, which is interpreted by TSD 44 as a request for the user identification code, TSD 44 transmits the user identification code with host 24 as addressee. Thereafter, TSD 44 enters the transparent mode. During transmission of the host address and user identification code by TSD 44, the echo by network 22 is inhibited, i.e., the half-duplex mode is entered, so that the host address and user identification code are not displayed on terminal 28 when sent by TSD 44.

Figure 19:
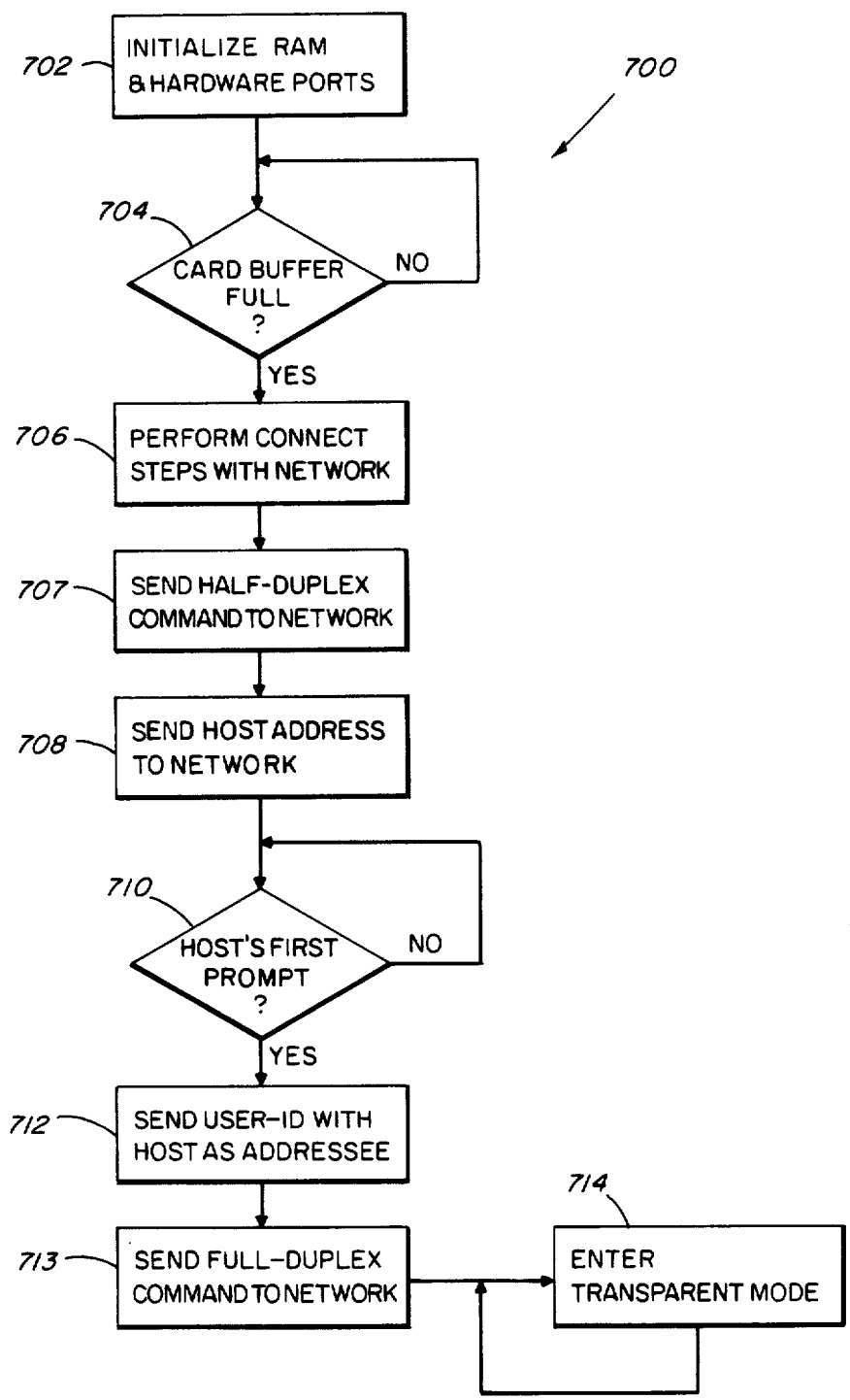
FIG. 19 is a functional flowchart of the main program of the terminal security device.

In order to implement the functions of the terminal security device, two major software modules are provided, a main program, and an interrupt-processing program. FIG. 19 shows flowchart 700 of the main program for TSD 44. The main program starts in block 702 wherein the data memory and the hardware ports of microcomputer 652 are initialized. Other housekeeping tasks may be performed in this part of the program. In decision block 704, the magnetic card buffer is tested to determine if it is full. The magnetic card buffer is a portion of data memory having a fixed length or data capacity reserved for storage of an input from the magnetic card reader. When the buffer is not full, the program loops continuously. When the buffer is full, signifying that data entry from the card reader has been completed, program control passes to block 706. Data entry from the card reader is performed on an interrupt basis, so that a program break will occur in the loop of block 704 almost immediately after completion of data entry from the card reader.

In block 706, the program executes the necessary sign-on procedures to establish a connection with network 22. From the perspective of network 22, the sign-on procedure will be the same as if TSD 44 were not present in the system. In block 707, TSD 44 sends a half-duplex command to network 22. In the half-duplex mode, the transmissions of the host address and user identification code by TSD 44 will not be displayed by terminal 28. In this way, the secrecy of these user keys may be maintained, even from the user himself. In block 713, TSD 44 sends a full-duplex command to network 22 prior to TSD 44's entry into the transparent mode. In the full-duplex mode, network echoing is restored. Subsequent user transmissions will be displayed on terminal 28. In block 708, the host address is sent to network 22 in order to obtain a connection with the particular host designated in the host address read from the magnetic stripe, e.g., host 24. The transmission of the host address is an automatic step performed by TSD 44. The user generally will not know the host address, since it is no longer entered manually by the user.

After a connection with host 24 has been made, host 24 sends a first prompt to the user via terminal 28. The contents of the host's first prompt will be unchanged from the operational procedures of the system prior to implementation of security apparatus in accordance with the invention. If the system has password security, the host's first prompt generally will request transmission of the user's password from the user. In any event, reception of the host's first prompt is interpreted by TSD 44 as confirmation of a host connection and as a request for transmission of the user identification code. In decision block 710, the program loops awaiting reception of the first prompt from host 24. When the host's first prompt is received, a program break occurs. Program control branches to block 712 in which the TSD 44 retrieves the user identification code from its data memory and transmits the user identification code to network 22 with host 24 as addressee. Thereafter, TSD 44 enters the transparent state for the duration of the communications session. As described above, the packet containing the user identification code will not be received by host 24. HSD 24 will intercept this packet and perform a validation check on the user identification code.

Figure 20:
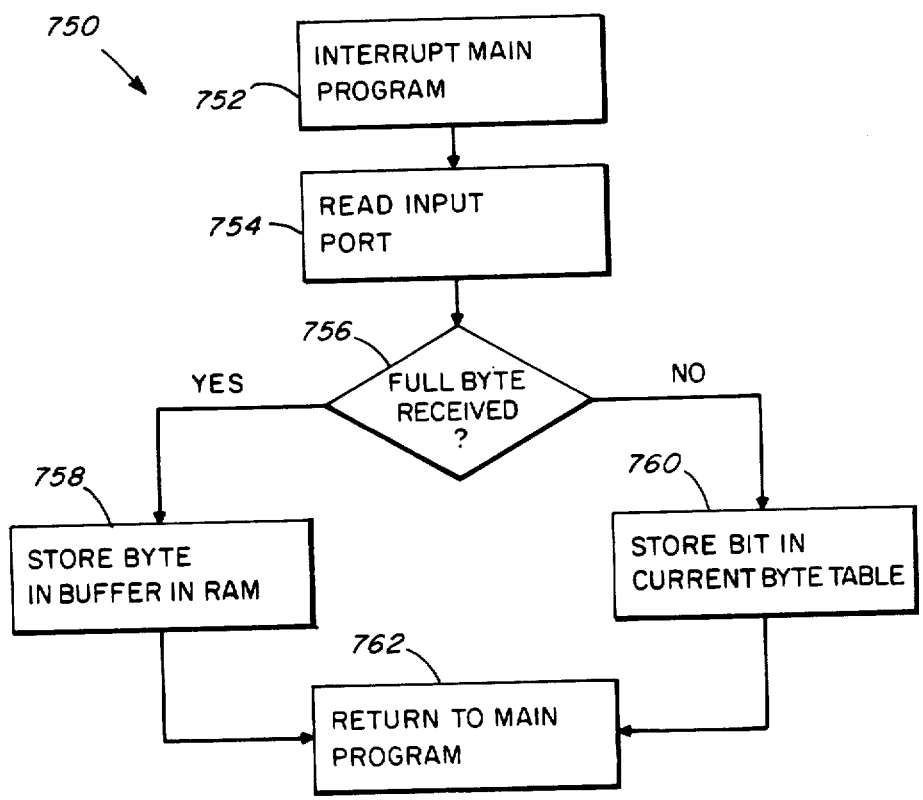
FIG. 20 is a functional flowchart of the interrupt processing program of the terminal security device.

FIG. 20 shows flowchart 750 describing the interrupt-processing program of TSD 44. Block 752 indicates that the interrupt processing is entered from the main program upon the occurrence of an interrupt sent by card reader 602 on clock line 656. Each interrupt indicates that one bit has been sent by card reader 602. In block 754, the interrupt-processing program reads the parallel input port, data line 654, of microcomputer 652. In decision block 756, the program determines whether a complete byte (eight bits) has been received from card reader 602. If the received byte is complete, the program branches to block 758 wherein the received byte is stored in the card buffer in data memory. In block 762, program control returns to the main program. If the received byte is incomplete in decision block 756, the current bit is added and stored in the current byte table in data memory, and program control returns to the main program via block 762. As described in connection with FIG. 19, the main program determines when the card buffer is full. When the card buffer is full, indicating that the transmission of data from the card reader has been completed, the main program commences the establishment of a communications session with host 24.

While there have been shown what are at present considered to be preferred embodiments of the invention, it will be apparent to those skilled in the art that various changes and modifications may be made herein without departing from the scope of the invention as defined by the appended claims.

What is claimed is:

1. In a packet-switched data communications system having a network with at least one data entry and display terminal for system users and at least one host data processor having a stored database for communicating with said terminal via plural data transmission paths of said network, wherein communication and processing of data is accomplished according to a pre-established protocol and data format and with preprogrammed software and wherein any user may obtain access from a terminal to the database associated with a selected processor for a data communications session therewith, the security improvement comprising:
a terminal security means introduced into said system in data communicative relationship with said terminal and said network for generating an initial data packet including data identifying an authorized user and the address of the processor with the database to be accessed, in advance of at least one additional data packet containing message data to be processed by the addressed processor, said initial data packet generated in said format and compatible with said protocol but incompatible with said programmed software for processing by the addressed processor, said terminal security means including
means responsive to user-initiated data entry seeking access from a terminal for detecting whether the data entry includes user identify data, and
means responsive to said detection for transmitting said initial data packet and said at least one additional data packet to the addressed processor via said network; and
a host security means introduced into said system in data communicative relationship with said network to intercept and process said initial data packet for allowing or denying the requested access according to whether any user identity data contained in the intercepted initial data packet designates the initiating user as authorized or unauthorized, respectively, to obtain the requested access, said incompatibility of said initial data packet rendering it and immediately following data packets unsuitable for processing by the addressed processor, whereby neither data contained in the initial data packet nor the message data contained in additional data packets immediately following said initial data packet can be processed by the addressed processor should said host security means fail for any reason to intercept said initial data packet, said host security means including
means for processing the intercepted initial data packet to detect any such user identity data contained therein,
means responsive to detected user identity data for authenticating the authorization of the user therefrom, and
means responsive to authentication of user authorization for generating an artificial data packet in place of said initial data packet, to render the immediately following data packets compatible with both said protocol and said preprogrammed software to enable the addressed processor to process the message data contained in said at least one additional data packet and to provide the requested access for a communications session with the authorized user.

2. The improvement according to claim 1, wherein said terminal security means further includes means responsive to transmission of said initial data packet for rendering said terminal security means transparent to data communications between the terminal and the network.

3. The improvement according to claim 1, wherein said terminal security means further includes preencoded media configured for insertion by the user to provide said user-initiated data entry from the terminal.

4. The improvement according to claim 3, wherein said terminal security means further includes means responsive to said detection therein for suppressing the display of the user identity data and the host processor address at said terminal.

5. The improvement according to claim 1, wherein said host security means further includes means responsive to said authentication of user authorization for rendering said host security mean transparent throughout the duration of the respective communications session, whereby an authorized user may communicate with the addressed processor from the terminal via said network without intervention of said host security means during such communications session.

6. The improvement according to claim 1, wherein user access in said data communications system further requires entry of a prescribed data password at a terminal to enable access to the database associated with a selected processor, and wherein the functions performed by said terminal security means and said host security means as recited in claim 1 provide an added security measure in said system to the security offered by transmission of the entered password via the network to the addressed processor for comparison with the prescribed data password thereat.

7. In a packet-switched data communications system having a network for transmission of data packets, at least one data entry and display terminal for system users to enter data into said network in packets addressed to a selected destination, and at least one host data processor having a stored database for communicating with said terminal in response to data received in said packets from said terminal through said network, wherein communication and processing of data is accomplished according to a pre-established protocol and data format and with preprogrammed software and wherein any user may obtain access from a terminal to the database associated with a selected processor for a data communications session therewith, the method of upgrading security to permit such access only to pre-authorized users, comprising:

generating from a terminal security device associated with said terminal, in response to a user-initiated data entry at said terminal seeking access to a database, a preconfigured initial data packet incompatible with said programmed software and containing data designating whether the user is authorized and the address of the processor having the database to which access is requested, followed by at least one additional data packet containing message data conforming to user-initiated data entry to be processed by the addressed processor, said step of generating including detecting from said user-initiated data entry the presence or absence of data therein identifying the user as an authorized user, and inputting said initial data packet followed by said at least one additional data packet into said network for transmission to the addressed processor; and intercepting at a host security device connected to said network in advance of and associated with the addressed processor the initial data packet to preclude its receipt by the addressed processor, and thereupon allowing or denying the requested access at the host security device according to whether data identifying the user as authorized is present in or absent from the intercepted initial data packet, respectively, said step of allowing or denying including detecting user identify data in the intercepted initial data packet, authenticating the authorization of the user from the detected user identity data, and upon authentication, delivering an artificial data packet to the addressed processor in lieu of said intercepted initial data packet solely to develop a proper data sequence for compatibility of said at least one additional data packet with said protocol, format and preprogrammed software for processing therewith, said incompatibility of said initial data packet rendering it and immediately following data packets unsuited for processing by the addressed processor, whereby the data contained in said initial data packet and the message data in the immediately following data packets could not be processed by the addressed processor if the initial data packet were not intercepted; and establishing at said host security device direct data communications between the addressed processed and the authorized user terminal immediately after the artificial data packet is delivered.

8. The method according to claim 7, further including providing each authorized user with pre-encoded media configured for insertion into the terminal to initiate data entry from the terminal and identify the user as authorized, and suppressing the display of user identity data and host processor address data at said terminal.

9. The method according to claim 7, wherein user access in said data communications system further requires entry of a prescribed data password at a terminal to enable access to the database associated with a selected processor, and wherein the step of allowing or denying the requested access further includes comparing the entered password with the prescribed password at the addressed processor following authentication of authorization from the user identity data detected in the intercepted initial data packet.

* * * * *